(12) United States Patent
Sugahara

(10) Patent No.: US 8,079,733 B2
(45) Date of Patent: Dec. 20, 2011

(54) INDICATOR AND INDICATOR-STRUCTURE

(75) Inventor: Hiroto Sugahara, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 281 days.

(21) Appl. No.: 12/343,211

(22) Filed: Dec. 23, 2008

(65) Prior Publication Data

US 2009/0167548 A1   Jul. 2, 2009

(30) Foreign Application Priority Data

Dec. 29, 2007   (JP) .................................. 2007-341545

(51) Int. Cl.
*F21V 1/00*   (2006.01)
*F21V 23/04*   (2006.01)

(52) U.S. Cl. ............ 362/276; 362/24; 362/84; 200/314; 340/665

(58) Field of Classification Search .................... 362/24, 362/84, 276; 200/314; 252/301.6 R; 340/665
See application file for complete search history.

(56) References Cited

U.S. PATENT DOCUMENTS

| | | | |
|---|---|---|---|
| 6,113,150 A * | 9/2000 | Kinberg | ............................ 283/94 |
| 6,159,394 A | 12/2000 | Akiyama et al. | |
| 6,280,655 B1 | 8/2001 | Xu et al. | |
| 2004/0120684 A1* | 6/2004 | Ishibashi et al. | .............. 385/141 |
| 2007/0029523 A1 | 2/2007 | Ishibashi et al. | |
| 2007/0080623 A1* | 4/2007 | Iimura | ........................... 313/483 |
| 2008/0232083 A1* | 9/2008 | Xu | .................................. 362/84 |

FOREIGN PATENT DOCUMENTS

| | | |
|---|---|---|
| JP | 2000-063824 | 12/1999 |
| JP | 2001-049251 | 2/2001 |
| JP | 2001-064638 | 3/2001 |
| JP | 2003-253261 | 9/2003 |
| JP | 2004-071511 | 3/2004 |
| JP | 2004-137329 | 5/2004 |
| JP | 2004-146302 | 5/2004 |
| JP | 2004-170308 | 6/2004 |
| JP | 2006-337385 | 12/2006 |

* cited by examiner

*Primary Examiner* — Stephen F Husar
*Assistant Examiner* — James Cranson, Jr.
(74) *Attorney, Agent, or Firm* — Frommer Lawrence & Haug LLP

(57) ABSTRACT

An indicator for emitting a light is provided, the indicator comprising a plate-shaped member which has a stress-concentrating section for causing stress concentration, and a stress-transmitting section for transmitting, to the stress-concentrating section, a stress generated due to an external force; wherein the stress-concentrating section is provided with a stress light-emitting section which is formed of a stress light-emitting material that emits the light in response to a change of the stress. The stress-concentrating section can be arranged such that the stress-concentrating section is not hidden by a finger when the force is applied to the indicator with the finger or the like. The visibility of the light emission can be secured by the light emission effected by the stress light-emitting material applied to the stress-concentrating section which is not hidden by the finger.

17 Claims, 13 Drawing Sheets

INDICATOR AND INDICATOR-STRUCTURE

CROSS REFERENCE TO RELATED APPLICATION

The present application claims priority from Japanese Patent Application No. 2007-341545, filed on Dec. 29, 2007, the disclosures of which are incorporated herein by reference in its entirety.

BACKGROUND OF THE INVENTION

1. Field of the Invention

The present invention relates to an indicator and an indicator-structure which are provided, for example, for lids and trays of electric apparatuses, electronic apparatuses, and mechanical apparatuses, wherein the indicator is capable of indicating the magnitude of the force applied to the lid, the tray or the like by means of the light.

2. Description of the Related Art

Conventionally, as shown in FIG. 13, for example, a switch 1 is provided, wherein when a stress light-emitting member film 2, which serves as an operating section of the switch 1, is pushed or pressed with a finger 3, the stress light-emitting member film 2 emits the light in accordance with the pushing force (see, for example, Japanese Patent Application Laid-open No. 2004-146302). In the case of this switch 1, when the stress light-emitting member film 2 is pushed with the finger 3, an upper electrode 4 and a lower electrode 5 make contact with each other to effect the conduction. Simultaneously, the light 6 is emitted from the stress light-emitting member film 2 to cause the change of the color of the stress light-emitting member film 2. Accordingly, it is possible to visually confirm the fact that an operator operates the switch 1.

However, in the case of the conventional switch 1 shown in FIG. 13, the light 6 is emitted when the stress light-emitting member film 2 is pushed with the finger 3. The color change is caused at the pushed portion of the stress light-emitting member film 2. The portion, which emits the light by being pushed with the finger 3, is hardly viewed by the operator. Therefore, it is difficult to visually recognized the magnitude of the force brought about by being pushed or pressed with the finger 3, and it is difficult to realize or really feel the magnitude of the force.

SUMMARY OF THE INVENTION

The present invention has been made in order to solve the problem as described above, an object of which is to provide an indicator wherein a plurality of stress-concentrating sections are arranged such that even when any one of the plurality of stress-concentrating sections is hidden by a finger, the other stress-concentrating sections are not hidden by the finger, for example, when a force is applied to the indicator with the finger, and the visibility of the light emission can be secured by the light emission effected by a stress light-emitting material applied to the stress-concentrating section not hidden by the finger.

According to a first aspect of the present invention, there is provided an indicator which emits a light, the indicator including:

a plate-shaped member which has a stress-concentrating section which causes a stress concentration, and a stress-transmitting section which is connected to the stress-concentrating section and which transmits, to the stress-concentrating section, a stress generated due to an external force applied to the stress-transmitting section, and a stress light-emitting section formed at the stress-concentrating section and formed of a stress light-emitting material which emits the light in response to a change of the stress.

According to the first aspect of the present invention, the plate-shaped member is provided with the stress-concentrating section for causing the stress concentration and the stress-transmitting section for transmitting, to the stress-concentrating section, the stress generated in the plate-shaped member resulting from the external force. Therefore, for example, even when a part of the stress-transmitting section is pressed with a finger or the like, there is no fear of blocking the light emission of the stress light-emitting section provided for the stress-concentrating section. It is possible to secure the visibility. In this way, in the indicator of the present invention, the portion to which the external force such as the pressing force is applied and the stress light-emitting section which emits the light in response to the stress can be arranged so that they are not overlapped with each other. It is possible to secure the visibility of the light emitted by the stress light-emitting section. The stress concentration herein refers to the stress which is exerted on a portion having an irregular shape (for example, an internal breakage, a hollow space, a recess from the surface, or a bottom portion having a sharp notch or cutout) and which is extremely larger than that exerted on uniform portions when the external force is exerted on a solid.

In the indicator of the present invention, the stress-concentrating section may include a plurality of individual stress-concentrating sections which are arranged with spacing distances with each other, the stress light-emitting section may include a plurality of individual stress light-emitting sections which are formed corresponding to the individual stress light-emitting sections respectively; and one of the individual stress light-emitting sections, which is provided for one of the individual stress-concentrating sections corresponding to the one individual stress light-emitting section, may emit the light in response to the external force applied to the stress-transmitting section.

In this arrangement, when the force is applied to the indicator, the stress is exerted on the plurality of individual stress-concentrating sections respectively depending on, for example, the magnitude of the force and the distances between the portion to which the force is applied and the respective individual stress-concentrating sections. The stress light-emitting material, which is applied to each of the individual stress-concentrating sections, emits the light at the luminance corresponding to the magnitude of the change of the stress. Accordingly, the luminance of the light emission and the number of the individual stress light-emitting sections which emit the light are changed, for example, depending on the magnitude of the force applied to the indicator. Therefore, the magnitude of the applied force can be viewed and really felt with the eyes. For example, when the force is applied to the indicator with the finger, even if any one of the individual stress-concentrating sections is hidden by being pressed with the finger, it is possible to allow the other individual stress-concentrating sections not to be hidden by the finger, because the plurality of individual stress-concentrating sections are arranged while being separated from each other by the spacing distances. Therefore, the visibility of the pressing force can be secured by means of the light emission effected by the stress light-emitting material applied to the individual stress-concentrating sections which are not hidden by the finger.

In the indicator of the present invention, the plurality of individual stress-concentrating sections may be formed as recesses or hollow space sections.

In this arrangement, when the force is applied to the indicator which is provided with the recesses or the hollow space sections as the stress-concentrating sections, the stress is concentrated on the portions which form the recesses or the hollow space sections. Therefore, the stress-concentrating sections can be formed at the desired portions by using the relatively simple structure.

In the indicator of the present invention, areas of the plate-shaped member, at which the individual stress-concentrating sections are formed, may be the recesses which have curvatures larger than those of the other areas at which the individual stress-concentrating sections are not formed.

In this arrangement, when the force is applied to the indicator which is provided with the recesses having the relatively large curvatures as the individual stress-concentrating sections, the stress is concentrated on the recesses. Therefore, the individual stress-concentrating sections can be formed at the desired portions by using the relatively simple structure.

In the indicator of the present invention, the plurality of the individual stress-concentrating sections may be formed as thin-walled sections.

In this arrangement, when the force is applied to the indicator which is provided with the thin-walled sections as the individual stress-concentrating sections, then the thin-walled sections are easily deformed, and the stress is concentrated thereon. Therefore, the individual stress-concentrating sections can be formed at the desired portions by using the relatively simple structure.

In the indicator of the present invention, the external force may be applied onto one predetermined surface of the plate-shaped member; and the individual stress light-emitting portions may be provided on the one surface of the plate-shaped member.

In this arrangement, when the individual stress light-emitting sections are provided on the front surface of the plate-shaped member (on the surface disposed on the side on which the external force is applied), the light, which is emitted from the individual stress light-emitting sections, can be visually recognized directly without transmitting the light through the plate-shaped member. Therefore, it is possible to select a desired material as the base material of the plate-shaped member.

In the indicator of the present invention, the plate-shaped member may include a base material, and the stress light-emitting material may be mixed into the base material of the plate-shaped member.

In this arrangement, the stress light-emitting material is mixed into the base material of the plate-shaped member, and hence it is possible to avoid the deterioration of the light-emitting function which would be otherwise caused by the disengagement of the stress light-emitting material from the plate-shaped member, as compared with a case in which the stress light-emitting material is applied to the surface of the plate-shaped member. Further, it is unnecessary to carry out the processing step including, for example, the application of the stress light-emitting material to the surface of the plate-shaped member. It is possible to reduce the production cost.

In the indicator of the present invention, the base material of the plate-shaped member may have a light-transmissive property.

In this arrangement, the light, which is emitted from the stress light-emitting material mixed into the base material of the plate-shaped member, can be allowed to outgo to the outside of the plate-shaped member efficiently. It is possible to enhance the luminance of the light emission.

In the indicator of the present invention, a base material of the plate-shaped member may have a light-transmissive property; the external force may be applied onto one surface of the plate-shaped member; and the individual stress light-emitting sections may be provided on the other surface of the plate-shaped member opposite to the one surface.

In this arrangement, the light, which is emitted by the individual stress light-emitting sections provided on the back surface of the plate-shaped member (on the surface disposed on the side opposite to the surface to which the external force is applied), can be allowed to outgo from the front surface by transmitting the light through the plate-shaped member having the light-transmissive property. The individual stress light-emitting sections are provided on the back surface of the plate-shaped member, and it is not exposed to the front surface thereof. Therefore, even when any external force is applied to the indicator, for example, when the operation is performed with the finger or the like, then it is possible to lower the possibility of the disengagement from the indicator. Further, the individual stress light-emitting sections are not provided on the front surface of the plate-shaped member. Therefore, this fact makes it possible to widen the range of selection of the design including, for example, the shape of the front surface of the indicator.

In the indicator of the present invention, a degree of the stress concentration of each of the individual stress-concentrating sections may be decreased at positions separated farther from a predetermined portion of the plate-shaped member.

In this arrangement, for example, when the force is applied to the predetermined portion of the plate-shaped member, then certain individual stress-concentrating sections, which are included in the plurality of the individual stress-concentrating sections and which are formed at the positions nearer to the predetermined portion, can be allowed to emit the light at larger luminances. It is possible to visually recognize the magnitude of the force applied to the plate-shaped member with ease.

In the indicator of the present invention, an operation-indicating section, which indicates that the predetermined portion is a pushing section or a pulling section, may be affixed to the predetermined portion.

In this arrangement, the indicated portion can be pushed or pulled by viewing the operation-indicating section. The range, in which the stress light-emitting material applied to the plurality of the individual stress-concentrating sections emits the light, is changed such that the range is widened or narrowed, in accordance with the pressing/pulling force for pressing/pulling the operation-indicating section. Therefore, the pressing force and the pulling force can be visually recognized. Further, it is possible to really feel the magnitude of the pressing force or the pulling force.

In the indicator of the present invention, individual stress-concentrating sections, which are included in the individual stress-concentrating sections and which are positioned separately farther from a predetermined portion of the plate-shaped member, each have a bottom portion with a shallower depth and/or smaller curvature.

In these arrangements, the stress concentration degree can be more decreased as the recess which is the stress-concentrating section has the shallower depth and/or the bottom portion has the smaller curvature. In this way, the smaller the stress concentration degree is, the smaller the luminance is, when the stress light-emitting material, which is applied to the stress-concentrating section, emits the light.

Therefore, for example, when the predetermined portion of the plate-shaped member is pushed with the finger, the stress light-emitting material of the individual stress-concentrating sections, which is formed at the position nearer to the predetermined portion, can be allowed to emit the light at the larger luminance. Further, the stronger the pressing force is when the predetermined portion is pushed or pressed with the finger, the wider the range is in which the stress light-emitting material applied to the individual stress-concentrating sections emits the light. Accordingly, it is possible to visually recognize the magnitude of the force applied to the indicator with ease.

In the indicator of the present invention, the stress-transmitting section of the plate-shaped member may be formed with an external force-applying section at which the external force is applied, and the individual stress-concentrating sections may be arranged to form a first group which surrounds the external force-applying section and a second group which surrounds the first group.

In this arrangement, the first group of the stress-concentrating sections which surrounds the external force-applying section for applying the external force and the second group which further surrounds the first group are formed. Therefore, when the magnitude of the external force applied to the external force-applying section is small, only the first group emits the light. When the magnitude of the external force is large, the second group emits the light as well. In other words, the magnitude of the external force applied to the external force-applying section can be grasped or recognized as the spread of the light.

In the indicator of the present invention, individual stress-concentrating sections, among the plurality of the individual stress-concentrating sections, forming each of the first group and the second group may be arranged at substantially a same distance from the external force-applying section respectively. Also in this arrangement, the magnitude of the external force applied to the external force-applying section can be grasped or recognized as the spread of the light.

In the indicator of the present invention, the individual stress-concentrating sections forming the first group may be deeper than the individual stress-concentrating sections forming the second group; or the individual stress-concentrating sections forming the first group may have bottom portions with curvatures which are larger than curvatures of bottom portions of the individual stress-concentrating sections forming the second group. In this arrangement, the magnitude of the external force applied to the external force-applying section can be grasped or recognized as the spread of the light. Further, the stress light-emitting sections of the stress-concentrating sections, which are included in the first group nearer to the external force-applying section, can be allowed to emit the light at luminances higher than those of the stress light-emitting sections of the second group. Therefore, it is possible to enhance the visibility of the indicator.

According to a second aspect of the present invention, there is provided the indicator-structure which includes the indicator as defined in the first aspect of the present invention, and an attachment section which is attached to a circumferential edge portion of the plate-shaped member, wherein the indicator has a rigidity which is smaller than that of the attachment section.

In this arrangement, the rigidity of the indicator is relatively smaller than that of the attachment section. Therefore, the plate-shaped member can be easily deformed by the force applied thereto. As a result, it is possible to increase the luminance of the light emission effected by the stress light-emitting material. Further, the rigidity can be increased for the attachment section on which the plate-shaped member is provided so that the attachment section can secure the strength required for the attachment section itself.

In the indicator-structure of the present invention, a thin-walled section may be provided at a boundary portion between the plate-shaped member and the attachment section.

In this arrangement, it is possible to enhance the degree of the change of the deformation of the indicator caused by the applied force, by providing the thin-walled section at the boundary portion between the plate-shaped member of the indicator and the attachment section. It is possible to increase the luminance of the light emission effected by the stress light-emitting material.

The indicator according to the present invention is provided with, for example, the plate-shaped member in which the stress light-emitting material is applied to the plurality of stress-concentrating sections. When the force is applied to the stress-transmitting section of the indicator, then the applied force is transmitted to the stress-concentrating sections, and the stress light-emitting material, which is applied to one or two or more of the stress-concentrating sections, emits the light in accordance with the magnitude of the force. Therefore, it is possible to provide the small-sized indicator in which the structure is simple and the cost is low.

When the indicator is applied, for example, to a lid member or a tray which can be opened or drawn by being pushed or pulled, the appropriate magnitude of the force, which makes it possible to open or draw the lid member or the tray, can be really felt by means of the luminance (intensity) of the light emitted by the stress light-emitting material applied to the stress-concentrating sections and/or the number of the stress-concentrating sections which emit the light. Therefore, the lid member or the tray can be opened or drawn easily and reliably with the appropriate force. As a result, it is possible to avoid the breakage of the lid member or the tray which would be otherwise caused by excessively applying the force. It is possible to reduce the re-execution of the operation in order to open/close the lid member or the like.

BRIEF DESCRIPTION OF THE DRAWINGS

FIG. 2 shows a cartridge lid member to which the indicator-structure according to the first embodiment of the present invention is applied, wherein

FIG. 3 shows an indication state of the cartridge lid member to which the indicator-structure according to the first embodiment of the present invention is applied, wherein

FIG. 4 shows another indication state of the cartridge lid member to which the indicator-structure according to the first embodiment of the present invention is applied, wherein

FIG. 5 illustrates the principle of the present invention, wherein

FIG. 6 illustrates the principle of the present invention, wherein

FIG. 7 illustrates the principle of the present invention, wherein

FIG. 9 shows a cartridge lid member to which an indicator-structure according to a third embodiment of the present invention is applied, wherein

FIG. 10 shows cartridge lid members to which indicator-structures according to respective embodiments of the present invention are applied, wherein

FIG. 11 shows a cartridge lid member to which an indicator-structure according to a seventh embodiment of the present invention is applied, wherein

FIG. 12 shows a cartridge lid member to which an indicator-structure according to an eighth embodiment of the present invention is applied, wherein

DESCRIPTION OF THE PREFERRED EMBODIMENTS

First Embodiment

Figure 1:
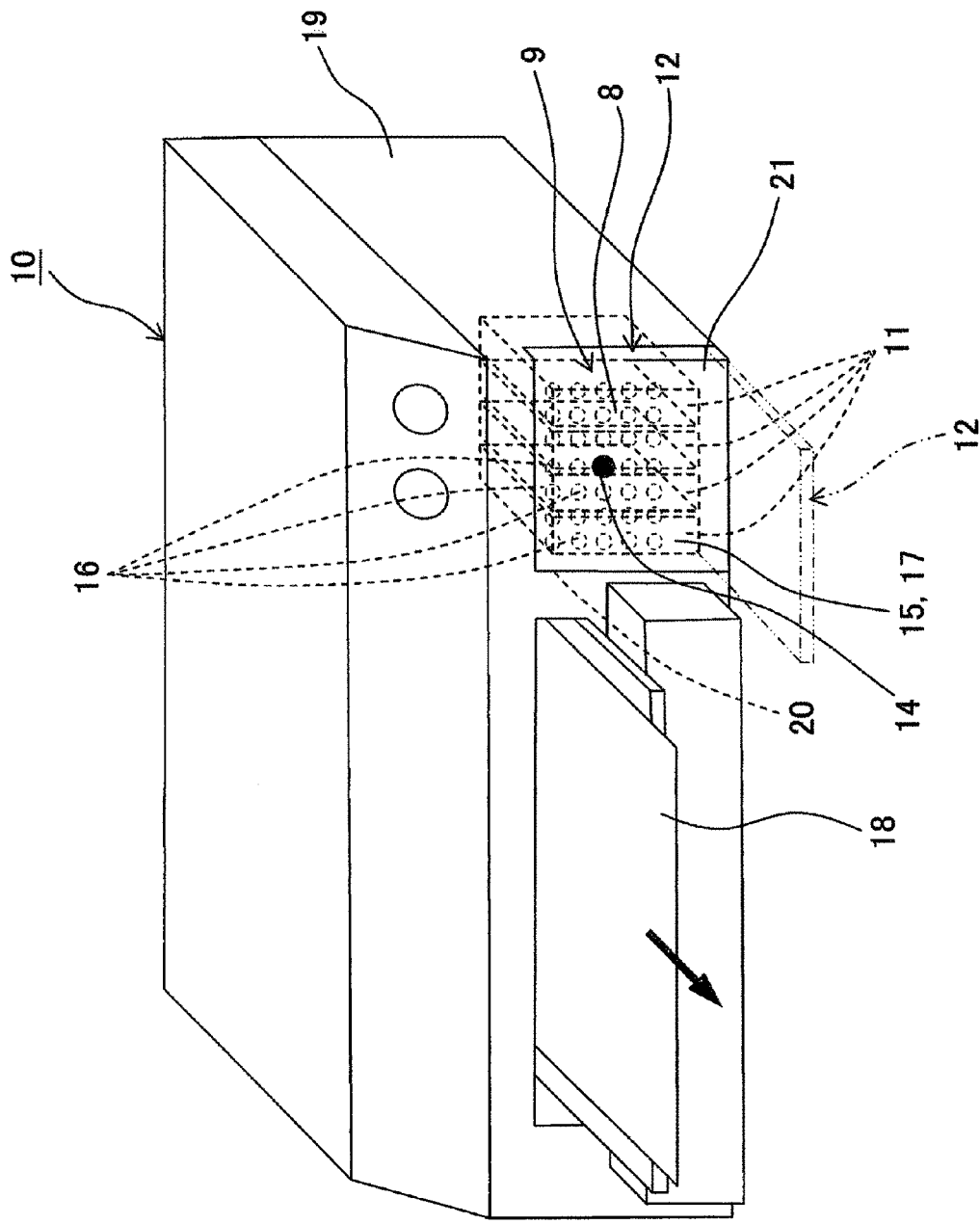
FIG. 1 shows a perspective view illustrating an ink-jet printer to which an indicator-structure according to a first embodiment of the present invention is applied.

An explanation will be made with reference to FIGS. 1 to 7 about a first embodiment of an indicator according to the present invention and an indicator-structure provided with the indicator. As shown in FIG. 1, for example, the indicator-structure 9, which is provided with the indicator 8, is applied to a cartridge lid member 12 for covering four ink cartridges (liquid supply sources) 11 installed to a cartridge-installing section of an ink-jet printer 10.

Respective four color inks (black, cyan, magenta, and yellow) are stored in the four ink cartridges 11 installed on the depth side (back side) of the cartridge lid member 12 shown in FIG. 1 respectively. The inks, which are stored in the respective ink cartridges 11, are supplied to a head unit via unillustrated four ink supply tubes. The inks, which are supplied to the head unit, are discharged from a large number of nozzle holes provided on the lower surface of the head unit. The inks are jetted onto a recording medium 18 such as the printing paper to perform the printing.

As shown in FIG. 1, the cartridge lid member 12 is a substantially rectangular plate-shaped member made of, for example, synthetic resin. The cartridge lid member 12 is provided to be capable of opening/closing a rectangular opening 20 which is formed at a front right side portion of a main casing body 19 of the ink-jet printer 10. The cartridge lid member 12 is provided swingably between the lid-closed position indicated by solid lines and the lid-open position indicated by alternate long and two short dashes lines about the center of a hinge section (not shown) provided at the lower edge portion of the cartridge lid member 12. In this arrangement, when the cartridge lid member 12 is moved in the lid-closing direction by an operator, and the cartridge lid member 12 is pressed against a lock mechanism (not shown) at the lid-closed position, then the cartridge lid member 12 is automatically locked. The lock mechanism is conventionally known, which is provided on the main casing body 19.

Regarding this lock mechanism, when the cartridge lid member 12, which is located at the closed position, is opened, it is appropriate that the operator pushes the lid member 12, for example, with a finger 13 in the lid-closing direction with a force of not less than a predetermined value or magnitude. When the lid member 12 is pushed, then the locking of the lock mechanism is disengaged, and the lid is opened as shown by the alternate long and two short dashes lines.

Figure 2A:
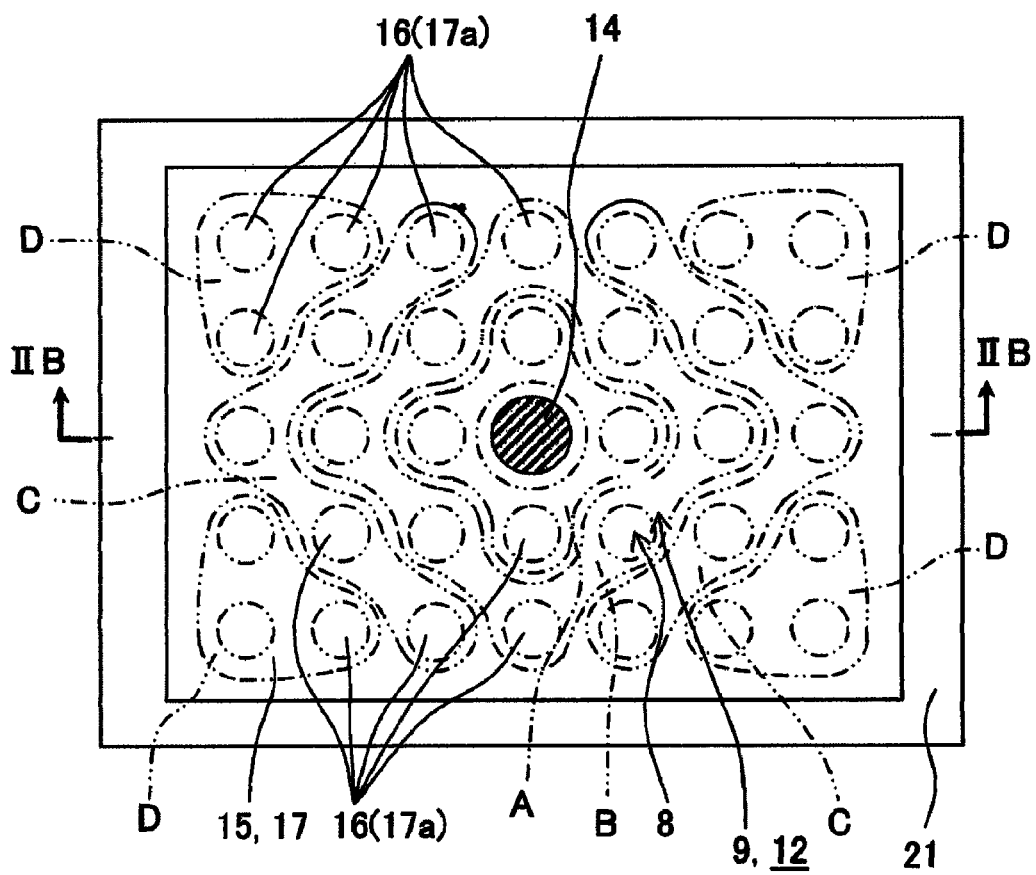
FIG. 2A shows a front view.
Figure 2B:
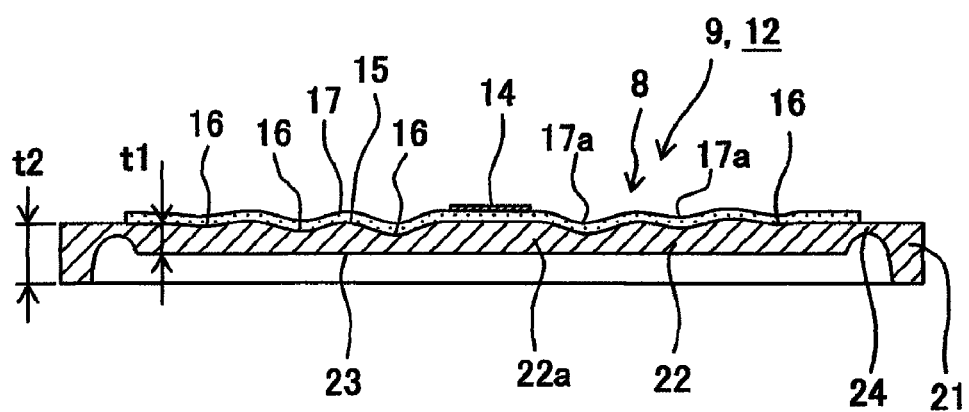
FIG. 2B shows a sectional view taken along a line IIB-IIB.

Next, an explanation will be made with reference to FIGS. 2 to 4 about the indicator-structure 9 provided for the cartridge lid member 12. FIG. 2A shows a front view illustrating the cartridge lid member 12, and FIG. 2B shows a sectional view taken along a line IIb-IIb illustrating the cartridge lid member 12 shown in FIG. 2A. The indicator-structure 9 includes the indicator 8 and an attachment section 21 to which the indicator 8 is attached. The indicator 8 includes a plate-shaped member 22 which includes a plurality of stress-concentrating sections 16 (individual stress-concentrating sections) provided on a surface 15 of the plate-shaped member 22, and a stress light-emitting section 17 which is formed to cover the stress-concentrating sections 16 and which emits the light at an intensity (luminance) in response to the change of the applied stress. Hereinafter, portions of the stress light-emitting section 17 formed on the stress-concentrating sections 16 are referred as individual light-emitting portions (individual light-emitting sections) 17a. That is, the stress light-emitting section 17 includes a plurality of individual light-emitting portions 17a corresponding to the stress-concentrating sections 16, respectively.

Figure 3A:
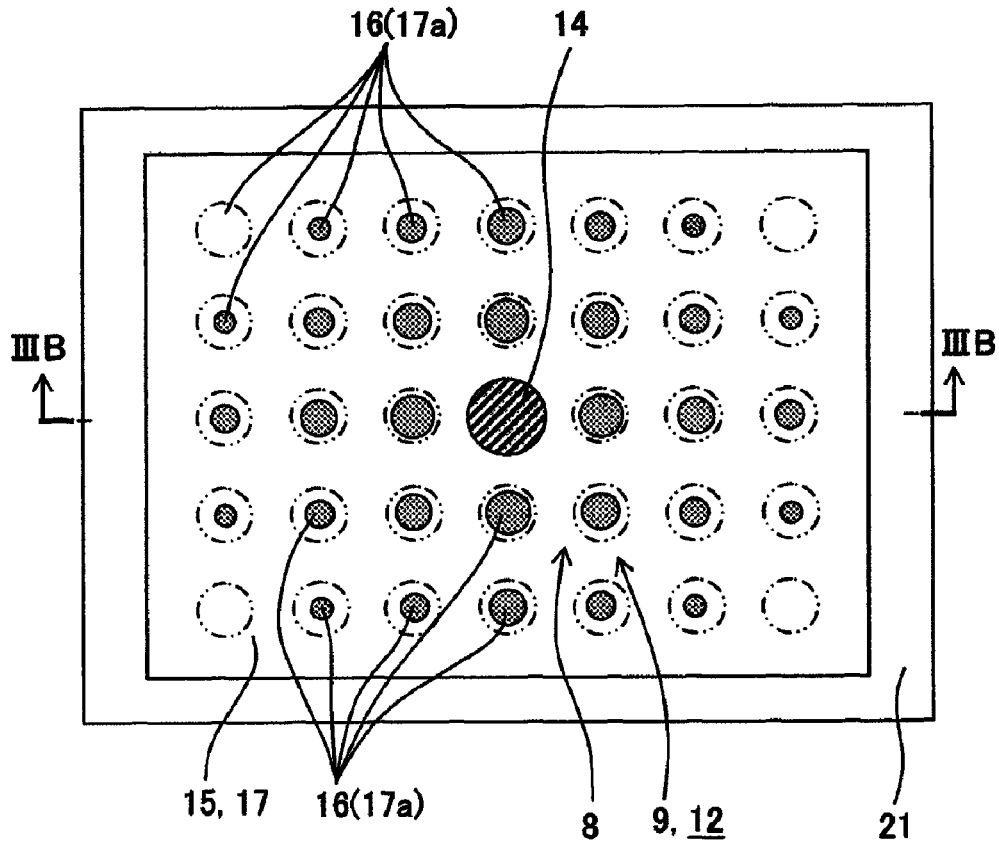
FIG. 3A shows a front view.
Figure 3B:
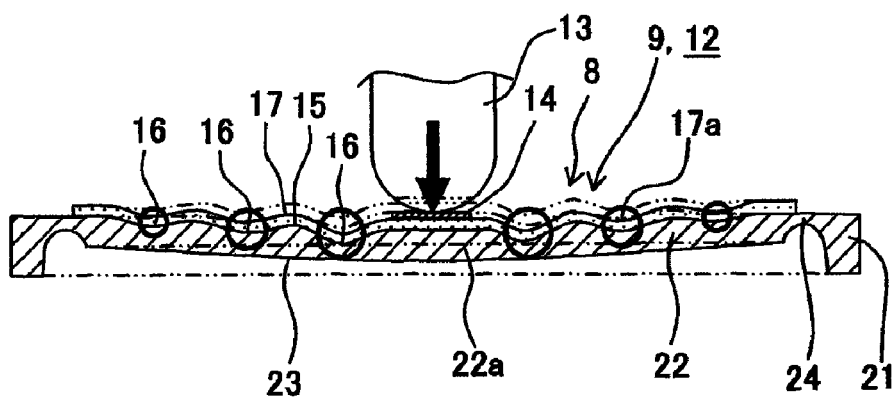
FIG. 3B shows a sectional view taken along a line IIIB-IIIB.

In the indicator-structure 9, as shown in FIGS. 3A and 3B, the stress light-emitting section 17, which is formed to cover the plurality of stress-concentrating sections 16 provided on the surface 15 of the plate-shaped member 22 of the indicator 8, emits the light in a light emission range at light emission intensities (luminances) corresponding to the magnitude of the pressing force, when an operation-indicating section 14, which is provided to make the indication at a substantially central portion of the indicator 8, is pushed or pressed with the finger 13 in order to open the cartridge lid member 12 by the operator.

The operator can realize or recognize the magnitude of the force with which the operator pushes the indicator 8 with the finger 13 by visually recognizing the light emission intensity and the light emission range of the stress light-emitting section 17. Accordingly, it is possible to recognize the appropriate magnitude of the force of the pushing operation with the finger 13 in order to open the cartridge lid member 12.

As shown in FIGS. 2A and 2B, the indicator 8 is provided with the plate-shaped member 22. The plurality of stress-concentrating sections 16, which are arranged while being separated from each other by spacing distances, are formed on the surface 15 of the plate-shaped member 22 (on the surface disposed on the front side, the operation being performed, for example, with the finger 13 by the operator on this side). The stress light-emitting section 17 is formed to have a predetermined thickness over the entire region of the surface 15 of the plate-shaped member 22 including the respective stress-concentrating sections 16. As shown in FIG. 2A, the respective stress-concentrating sections 16 are depicted by circles of alternate long and two short dashes lines.

The plurality of stress-concentrating sections 16 are provided in order that the stress, which is generated in the cartridge lid member 12, is concentrated on the respective stress-concentrating sections 16, for example, when the operator pushes the surface of the cartridge lid member 12 with the finger 13 in order to open the cartridge lid member 12. Portions (flat portions 22a) of the plate-shaped member 22, at which the stress-concentrating sections 16 are not formed, function as the stress-transmitting section for transmitting the stress generated in the lid member 12 to the stress-concentrating sections 16. The purpose of the concentration of the stress on the respective stress-concentrating sections 16 as described above is as follows. That is, the luminance (light emission intensity) of the light emitted from the individual stress light-emitting portions 17a, overlapping with the respective stress-concentrating sections 16 is larger than the luminance of the light emitted from other portions, of the stress light-emitting section 17, not overlapping with the stress-concentrating sections 16. Accordingly, the force, which is brought about when the indicator 8 is pushed, can be clearly expressed by the light emission of the individual stress light-emitting portions 17a formed on the stress-concentrating sections 16. The portion, which functions as the stress-transmitting section, is not limited to the flat portion 22a of the plate-shaped member 22. For example, when one of the stress-concentrating section 16 is pressed, the pressing force is transmitted as the stress to the adjoining stress-concentrating section 16 via the plate-shaped member 22. In this case, when a certain area of the plate-shaped member 22 is pressed, and the force, which is exerted on the concerning area, is transmitted through the interior of the plate-shaped member 22 to arrive at the adjoining stress-concentrating section 16, then the portion of the plate-shaped member 22, which ranges from the pressed area to the stress-concentrating section 16, functions as the stress-transmitting section. In this case, it is not significant whether or not the stress-concentrating section is formed in the pressed area of the plate-shaped member 22 which has been pressed and another area of the plate-shaped member 22 which functions as the stress-transmitting section.

The respective stress-concentrating sections 16 are recesses (depressions) which are formed on the surface 15 of the plate-shaped member 22. The respective recesses have shapes which amount to parts of spheres, and bottom portions of the respective recesses are formed to have predetermined curvatures. As shown in FIG. 2A, the stress-concentrating sections 16 are formed in seven arrays in the vertical direction and five arrays in the lateral direction. In other words, the stress-concentrating sections 16 are arranged in a lattice form. The central portion, of the surface 15 of the plate-shaped member 22 arranged with the stress-concentrating sections 16 in the lattice form, is formed as a flat portion, and the stress-concentrating section 16 is not formed at the central portion. Therefore, in this embodiment, the thirty-four stress-concentrating sections 16 are formed on the surface of the plate-shaped member 22. The circular operation-indicating section 14 is formed at the central flat portion. The operation-indicating section 14 may be colored. The stress-concentrating sections 16 are provided by forming the recesses on the front surface 15 of the plate-shaped member 22 having the predetermined thickness as described above. Therefore, the respective portions, at which the stress-concentrating sections 16 are provided, are thin-walled sections 24 having the thicknesses smaller than those of the other portions.

When the stress-concentrating sections 16 are provided as the recesses or the thin-walled sections 24, the stress, which is generated in the indicator 8, can be effectively concentrated on the stress-concentrating sections 16 by the aid of the stress-transmitting section 22a. In other words, the stress-concentrating sections 16 can be formed at the desired portions by using the relatively simple structure as described above.

Further, as shown in FIG. 2B, the respective stress-concentrating sections 16 are formed so that the stress concentration degree is decreased at positions directed farther from the portion to which the operation-indicating section 14 is affixed to the circumferential edge portion of the indicator 8. That is, the respective stress-concentrating sections 16 are formed so that the stress concentration degree is decreased at positions separated farther from the portion to which the operation-indicating section 14 is affixed. As for a method for decreasing the stress concentration degree, the curvatures of the bottom portions of the recesses for forming the respective stress-concentrating sections 16 are decreased respectively, and the depths of the recesses are decreased.

Specifically, the four stress-concentrating sections 16 (first group), which are arranged in the substantially rectangular frame-shaped area "A" adjacent to the operation-indicating section 14 shown in FIGS. 2A and 2B, are formed to have the relatively large curvature. Therefore, the stress is concentrated to a great extent on the four stress-concentrating sections 16. In other words, the stress concentration degree is maximum. The eight stress-concentrating sections 16 (second group), which are arranged in the rectangular frame-shaped area "B" surrounding the outer side of the area A, are formed to have the middle curvature smaller than that of those disposed in the area "A". Therefore, the stress concentration degree is middle. The respective five stress-concentrating sections 16 (third group) are arranged in each of the two areas "C" having curved shapes disposed on the both left and right sides of the area "B". The curvature of each of the stress-concentrating sections 16 is smaller than that of those disposed in the area "B". In other words, the stress concentration degree is further smaller than that of the stress-concentrating sections disposed in the area "B". Further, the respective three stress-concentrating sections 16 (fourth group), which are arranged in each of the four corner areas "D" of the indicator 8, are formed to have the curvature further smaller than that of those disposed in the area "C". In other words, the stress-concentrating section arranged in the area "D" has the minimum stress concentration degree. In FIG. 2A, the areas "A, B, C, D" are depicted as the areas surrounded by alternate long and two short dashes lines.

Figure 4A:
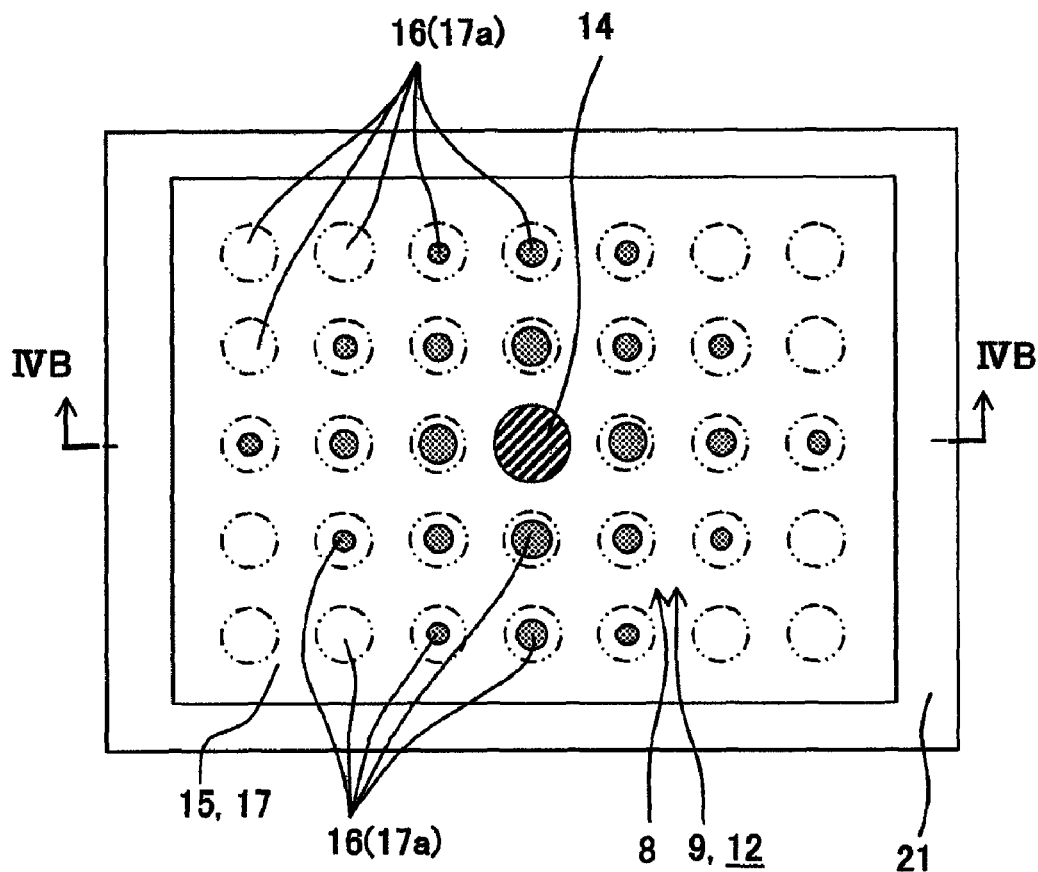
FIG. 4A shows a front view.

As described above, the stress-concentrating sections 16 are formed so that the stress concentration degree is decreased at the positions separated farther from the portion to which the operation-indicating section 14 is affixed, i.e., in the order of the area "A", the area "B", the area "C", and the area "D". Accordingly, for example, when the operation-indicating section 14 of the indicator 8 shown in FIG. 3A is pushed with the finger 13, the stress light-emitting section 17 can be allowed to emit the light at the larger luminances at the stress-concentrating sections 16 formed in the area nearer to the operation-indicating section 14. In FIGS. 3A and 4A, the hatched circular areas indicate the light emission ranges of the individual stress light-emitting portions 17a. In other words, the hatched circular areas indicate the light emission amounts (luminances) of the respective individual stress light-emitting portions 17a. In this embodiment, the stress-concentrating sections 16 are formed so that the stress concentration degree is decreased in the order of the areas A to D. Therefore, the range of the light emission of each of the individual stress light-emitting portions 17a formed at corresponding one of the stress-concentrating sections 16 can be decreased in the order of the areas A to D.

Further, the range (area) of the stress light-emitting section 17, in which the individual stress light-emitting portions 17a emits the light, can be widened outwardly in the order of the area A, the area B, the area C, and the area D, as the pressing force, which is applied when the operation-indicating section 14 is pushed with the finger 13, is strengthened. Accordingly, it is possible to visually recognize the magnitude of the force applied to the indicator 8 with ease.

In FIG. 3B, the circles, which have the same sizes as those of the hatched circles shown in FIG. 3A, are depicted at the stress-concentrating sections 16 corresponding thereto respectively. The descending order, in which the luminance is decreased as starting from one having the large luminance when the operation-indicating section 14 is pushed, is the order of the area A, the area B, the area C, and the area D shown in FIG. 3A. Similarly, the descending order in which the light emission range is decreased as starting from one having the large light emission range in relation to the respective stress-concentrating sections 16 is also the order of the area A, the area B, the area C, and the area D shown in FIG. 3A.

As shown in FIGS. 2A and 2B, the rectangular circumferential edge portion of the indicator 8 is joined to the rectangular frame-shaped attachment section 21. The thickness t1 of the indicator 8 is smaller than the thickness t2 of the attachment section 21. Accordingly, the rigidity of the indicator 8 is smaller than that of the attachment section 21. As shown in FIG. 2B, a rectangular frame-shaped thin-walled section 24 is formed at the boundary portion between the outer circumferential portion of the indicator 8 and the inner circumferential portion of the attachment section 21, on the back surface 23 of the cartridge lid member 12. The thin-walled section 24 is provided by forming the groove having a circular arc-shaped cross section on the lower surface of the boundary portion.

As described above, the rigidity of the indicator 8 is made relatively smaller than that of the attachment section 21, and the thin-walled section 24 is provided at the boundary portion between the indicator 8 and the attachment section 21. Therefore, the indicator 8 can be easily deformed when the force is applied to the indicator 8. As a result, it is possible to relatively increase the luminances of the light emission effected by the individual stress light-emitting portions 17a at the respective stress-concentrating sections 16. Further, the attachment section 21, on which the indicator 8 is provided, has the rigidity which is made relatively larger than that of the indicator 8. Therefore, the rigidity of the attachment section 21 can be enhanced so that the strength, which is required for the attachment section 21, can be secured.

Next, the stress light-emitting section 17 will be explained. The stress light-emitting section 17 is formed of, for example, a substance obtained by adding europium (Eu) (rare earth substance) as the light emission center to $Sr_3Al_2O_6$ (aluminic acid salt) as the base material, or a material obtained by adding neodymium (Nd) (transition metal substance) as the light emission center to $Ca_3Al_2O_6$ (aluminic acid salt) as the base material. More specifically, the stress light-emitting material can be prepared by adding 0.6 wt % Eu as the light emission center and 1 wt % boric acid as the flux to $Sr_3Al_2O_6$ as the base material, followed by being sintered at 1300° C. for about 4 hours in a reducing atmosphere ($Ar+H_2$ 5%). The obtained product can be utilized by converting it into a powder.

Other than the above, those usable as the stress light-emitting material include $Sr_{0.90}Al_2O_{3.90}$: $Eu_{0.01}$ (see Japanese Patent Application Laid-open No. 2000-63824), $Ca_2Al_2SiO_7$:Ce, $Ca_2MgSi_2O_7$:Ce (see Japanese Patent Application Laid-open No. 2001-49251), and $ZnAl_2O_4$: Mn, $BaAl_2O_4$:Ce (see Japanese Patent Application Laid-open No. 2001-64638).

As shown in FIGS. 2A and 2B, when the stress light-emitting section 17 is provided on the surface 15 of the indicator 8, then the powder of the stress light-emitting material is mixed with an adhesive of, for example, the epoxy system having the light-transmissive property to prepare a paste, and the paste is applied to have a predetermined thickness onto the front surface 15 of the indicator 8. In this way, the stress light-emitting section 17 is provided on the entire front surface 15 of the indicator 8.

Next, an explanation will be made about the function of the indicator-structure 9 provided with the indicator 8 constructed as described above. As shown in FIGS. 3A and 3B, for example, when the operator pushes the operation-indicating section 14 indicated at the substantially central portion of the indicator 8 with the finger 13 in order to open the cartridge lid member 12, the stress is applied to the plurality of stress-concentrating sections 16 via the stress-transmitting section 21a depending on the magnitude of the pressing or pushing force, the distances between the operation-indicating section 14 to which the force is applied and the respective stress-concentrating sections 16, and the stress concentration degrees of the respective stress-concentrating sections 16. The individual stress light-emitting portions 17a, which are formed at the respective stress-concentrating sections 16, emit the light at the luminances of the light emission (intensities of the light emission) corresponding to the magnitude of the change of the stress.

When the magnitude of the force applied to the operation-indicating section 14 is changed as described above, the luminances of the light emission (light emission intensities) of the individual stress light-emitting portions 17a at the respective stress-concentrating sections 16, the number of the individual stress-concentrating portions 17a to emit the light, and the sizes of the light-emitting portions of the stress light-emitting sections 17 formed at the respective stress-concentrating sections 16 are changed depending on the magnitude of the force. Therefore, the magnitude of the applied force can be viewed with the eyes, and the magnitude of the applied force can be recognized or realized. For example, when the light emission is effected as in the indicator 8 shown in FIG. 3A, as depicted by the plurality of hatched circles, the four individual stress light-emitting portions 17a, which are formed at the four stress-concentrating sections 16 in total provided one by one at the respective four corners of the indicator 8, do not emit the light (the case, in which the light is emitted to such an extent that no person can make the recognition, is regarded as no light emission as well, and this definition is also affirmed in the followings), and the other individual stress light-emitting portions 17a, which are formed at the other stress-concentrating sections 16, emit the light. In this situation, the operator can realize that the operation-indicating section 14 is pushed with a relatively strong force.

Figure 4B:
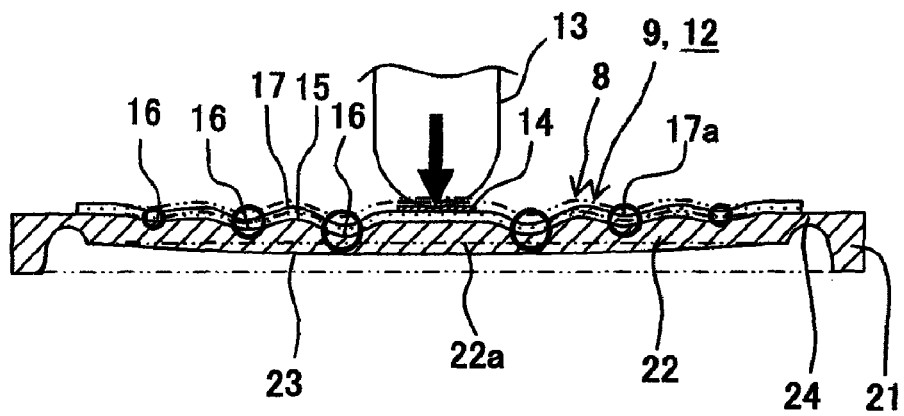
FIG. 4B shows a sectional view taken along a line IVB-IVB.

FIGS. 4A and 4B show the light emission state of the indicator 8 when the operation-indicating section 14 is pushed with the finger 13 with a force smaller than that of the case having been explained with reference to FIGS. 3A and 3B. As shown in FIG. 4A, a part of the individual stress light-emitting portions 17*a* (in the four areas D), which are formed at the twelve stress-concentrating sections 16 in total composed of the respective three provided at each of the four corners of the indicator B, do not emit the light. The other individual stress light-emitting portions 17*a*, which are formed at the other stress-concentrating sections 16, emit the light. In this case, the operator can really feel the fact that the operation-indicating section 14 is pushed with the relatively weak force.

As described above, the plurality of stress-concentrating sections 16, which are provided with the individual stress light-emitting portions 17*a*, are arranged so that they are spread outwardly about the center of the operation-indicating section 14. Therefore, it is possible to visually recognize the outward spread of the areas in which the stress light-emitting sections 17 emit the light in response to the magnitude of the pressing force applied to the operation-indicating section 14 (strictly the amount of change of the pressing force). That is, when the operation-indicating section 14 is pressed with a weak force, only a part of the individual stress light-emitting portions 17*a*, which are arranged at the stress-concentrating sections 16 arranged near to the operation-indicating section 14, emit the light. However, as the operation-indicating section 14 is pressed with a stronger force, other individual stress light-emitting portions 17*a*, which are arranged at the stress-concentrating sections 16 disposed on the outer side, also emit the light. Further, the shapes of the stress-concentrating sections 16 differ depending on the distances from the operation-indicating section 14. The stress-concentrating sections 16, which are disposed nearer to the operation-indicating section 14, are formed to have the higher stress concentration factors. Therefore, when the operation-indicating section 14 is pressed with a force of a certain magnitude, a part of the individual stress light-emitting portions 17*a*, which are provided at the stress-concentrating sections 16 disposed nearer to the operation-indicating section 14, emit the light at the higher luminances. In other words, the luminance of each of the individual stress light-emitting portions 17*a* is changed depending on the distance from the operation-indicating section 14.

It is assumed that the pushing force, which is applied when the indicator 8 emits the light to the extent as shown, for example, in FIGS. 3 and 4, has the appropriate magnitude to open/close the cartridge lid member 12. On this assumption, the force, which is appropriate to open/close the cartridge lid member 12, can be unconsciously learned by the operator in accordance with the light emission states of the indicator 8 shown in FIGS. 3 and 4 and the pushing forces with the finger 13. Accordingly, the cartridge lid member 12 can be opened/closed easily and reliably with the appropriate force. As a result, it is possible to avoid the breakage of the cartridge lid member 12 which would be otherwise caused by applying any excessive force. Further, it is possible to reduce the re-execution of the operation in order to open/close the lid member 12.

According to the indicator-structure 9 shown in FIGS. 2A and 2B, for example, even when any one of the stress-concentrating sections 16 is pushed without pushing the operation-indicating section 14 with the finger 13, and one of the individual stress light-emitting portions 17*a*, which is formed at the concerning stress-concentrating section 16, is hidden by the finger 13, then other individual stress light-emitting portions 17*a*, which are formed at other stress-concentrating sections 16 not pushed with the finger 13, cannot be hidden by the finger 13, because the plurality of stress-concentrating sections 16 are arranged while being separated from each other by the spacing distances. Therefore, the visibility of the pressing force can be secured by the light emission effected by the individual stress light-emitting portions 17*a* formed at the stress-concentrating sections 16 not hidden by the finger 13. In other words, when the stress-transmitting section 22*a* of the indicator 8 is pressed, the stress is transmitted via the stress-transmitting section 22*a* to the stress-concentrating sections 16 disposed around the pressed portion. As a result, an area, of the stress light-emitting section 17, which is different from the directly pressed portion of the indicator 8, also emit the light. Therefore, for example, when a certain area of the indicator 8 is pushed with the finger, the light is also emitted from the stress light-emitting sections 17 disposed separately from the area, without being limited to the area pressed with the finger. Therefore, as described above, it is possible to secure the visibility of the pressing force in accordance with the light emission effected by the stress light-emitting sections 17 formed at the stress-concentrating sections 16 which are not hidden by the finger 13.

According to the indicator 8 provided for the indicator-structure 9, the plate-shaped member 22 is provided, which has the stress light-emitting section 17 having the predetermined thickness formed on the front surface 15 including the plurality of stress-concentrating sections 16. In this arrangement, when the force is applied to the indicator 8, the stress light-emitting section 17, which is formed at one or more of the stress-concentrating sections 16, emits the light in response to the magnitude of the force. That is, when the force is applied to the indicator 8, one or more individual stress light-emitting portions 17*a* emit the light in response to the magnitude of the force. Therefore, it is possible to provide the indicator 8 which has the simple structure, which is small-sized, and which involves the low cost.

According to the indicator 8 provided for the indicator-structure 9, as shown in FIG. 3B, the stress light-emitting section 17 is formed on the surface 15 of each of the stress-concentrating sections 16. Therefore, the light, which is emitted from the stress light-emitting section 17 (the individual stress light-emitting portions 17*a*), can be visually recognized directly without transmitting the light through the plate-shaped member 22. Therefore, it is possible to select any desired material as the base material of the plate-shaped member 22.

Next, an explanation will be made about the principle of the light emission of the stress light-emitting section 17 by applying the force to the indicator 8, the stress light-emitting section 17 being formed at the large number of stress-concentrating sections 16 formed on the front surface 15 of the indicator 8 as shown in FIGS. 3A and 3B.

Figure 5A:
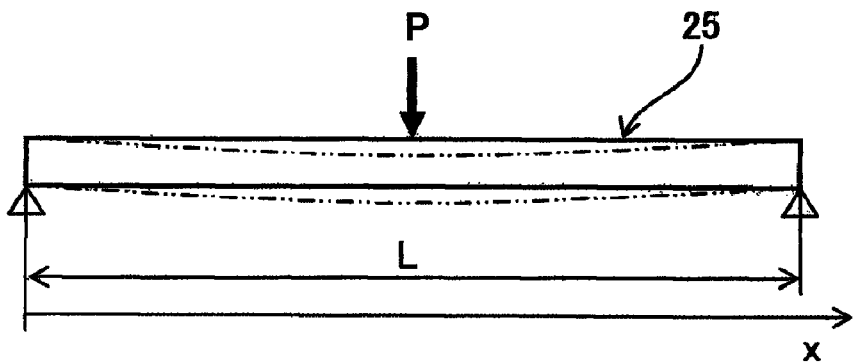
FIG. 5A shows a front view illustrating a beam which is supported at both ends.
Figure 5B:
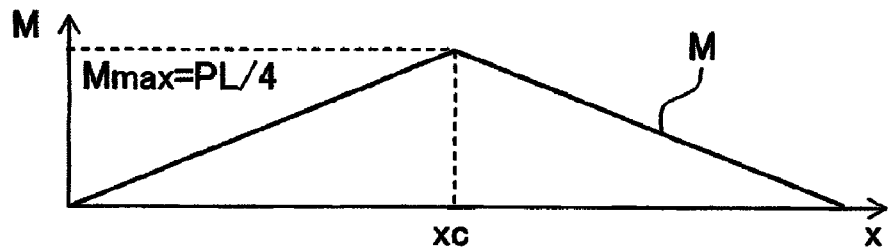
FIG. 5B shows the bending moment generated in the beam.
Figure 5C:
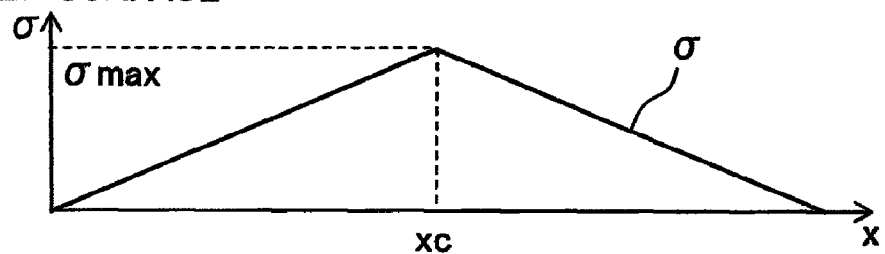
FIG. 5C shows the compressive stress value generated on the upper surface of the beam.

FIG. 5A shows a beam 25 having a constant cross-sectional shape and having a length L, the beam 25 being arranged horizontally and supported at both ends. Any groove to serve as the stress-concentrating section 27 is not provided on the upper surface of the beam 25. When the vertical load P is applied to the center of the beam 25, the bending moment M acts on respective portions of the beam 25 as shown in FIG. 5B. FIG. 5C shows the value a of the compressive stress allowed to act on the respective portions of the upper surface of the beam 25 in this situation. As understood from this drawing, even when the stress-concentrating section (groove) 27 is not provided on the upper surface of the beam 25, the value C of the compressive stress allowed to act on the respective portions of the upper surface of the beam 25 is increased at positions directed toward the center from the both ends of the beam 25.

Figure 6A:
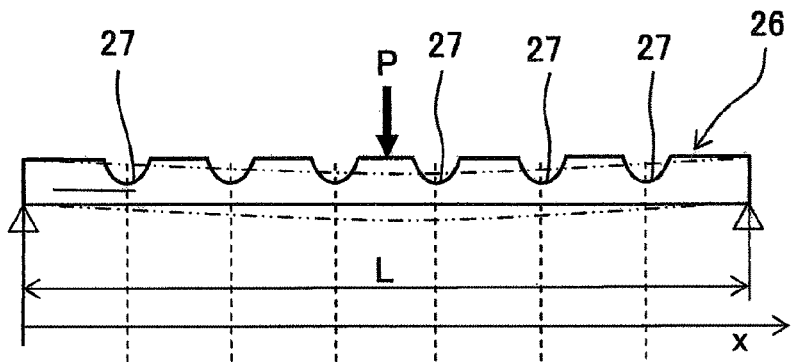
FIG. 6A shows a front view illustrating a beam which is supported at both ends and which has a plurality of stress-concentrating sections formed on the upper surface.
Figure 6B:
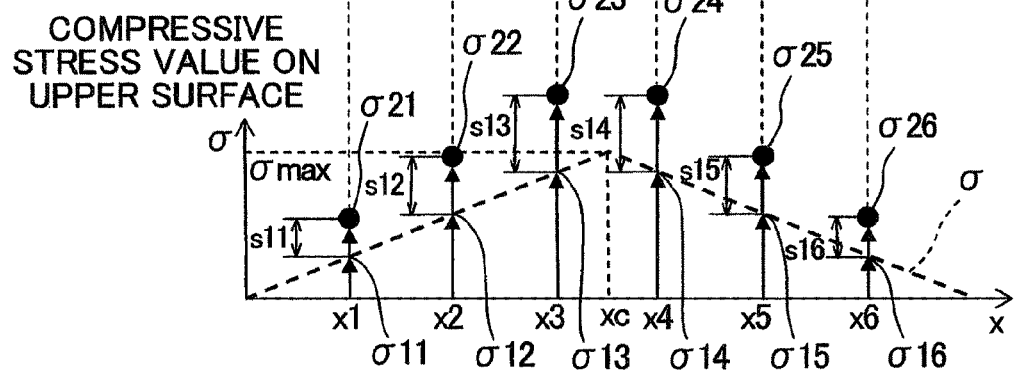
FIG. 6B shows the compressive stress value generated on the upper surface of the beam.

FIG. 6A shows a beam 26 having a constant cross-sectional shape and having a length L, the beam 26 being arranged horizontally and supported at both ends. Six stress-concentrating sections (grooves) 27 are provided on the upper surface of the beam 26 while being separated from each other by spacing distances. The respective stress-concentrating sections 27 have the same shape and the same size. FIG. 6B shows the value σ of the compressive stress allowed to act on respective portions of the upper surface of the beam 26 when the vertical load P (external force) is applied to the center of the beam 26. Broken lines indicate values σ11, σ12, . . . , σ16 of the compressive stress brought about for a beam 25 in which any stress-concentrating section (groove) 27 is not provided on the upper surface. Small solid circles indicate values σ21, σ22, . . . , σ26 of the compressive stress allowed to act on the respective stress-concentrating sections 27.

It is now assumed that D represents the depth of the stress-concentrating section (groove) 27, and ρ represents the radius of the bottom of the stress-concentrating section 27. On this assumption, the stress concentration factor (stress concentration degree) K is represented by the following expression.

$$K = 1 + 2 \times (D/\rho)^{1/2}$$

As expressed in this expression, the larger the depth D of the stress-concentrating section 27 is, the larger the stress concentration factor K is. Further, the smaller the radius ρ of the bottom of the stress-concentrating section 27 is, the larger the stress concentration factor K is.

As understood from FIG. 6B, the values σ21, σ22, . . . , σ26 of the compressive stress allowed to act on the respective stress-concentrating sections 27 are extremely larger than the values σ11, σ12, . . . , σ16 of the compressive stress obtained when the stress-concentrating sections 27 are not provided at the concerning positions. It is appreciated that the stress is concentrated. The differences between the respective compressive stress values are s11, s12, . . . , s16.

Figure 6C:
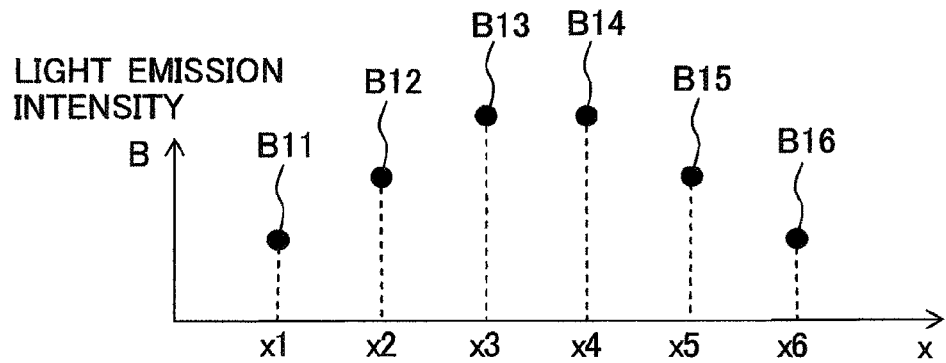
FIG. 6C shows the light emission intensity of the stress light-emitting section formed on the upper surface of the beam.

FIG. 6C shows light emission intensities (luminances) B11, B12, . . . , B16 obtained when the stress light-emitting sections 17 emit the light when the stress light-emitting sections 17 (not shown) having a predetermined thickness are formed on the upper surfaces of the respective stress-concentrating sections 27. As understood from this drawing, the light emission intensity B substantially corresponds to the degree of the compressive stress value σ. The light emission intensities of the stress light-emitting sections 17 formed at the respective stress-concentrating sections 27 are extremely larger than the light emission intensities of the stress light-emitting sections 17 formed on the upper surfaces of the surrounding portions at which the stress-concentrating sections 27 are not provided.

According to the principle as described above, for example, when the operation-indicating section 14 of the indicator 8 shown in FIGS. 3A and 3B is pushed with the finger 13, the stress light-emitting sections 17, which are formed at the respective stress-concentrating sections 27 as shown in the same drawings, can emit the light at the light emission intensities (luminances) larger than those of the stress light-emitting sections 27 formed at the portions at which any stress-concentrating section 27 is not formed.

Figure 7A:
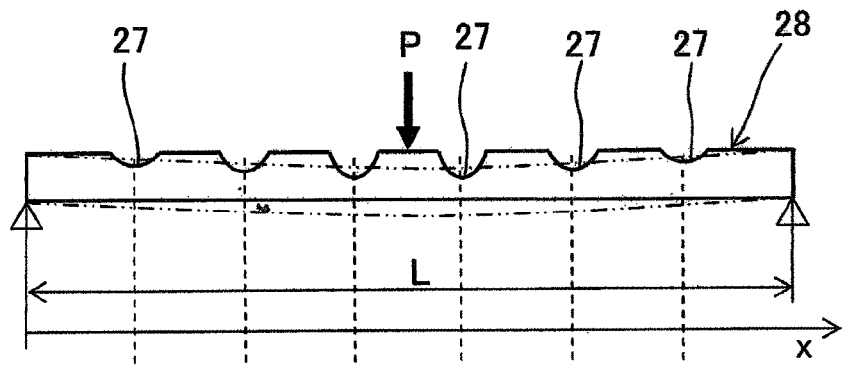
FIG. 7A shows a front view illustrating another exemplary beam which is supported at both ends and which has a plurality of stress-concentrating sections formed on the upper surface.

FIG. 7A shows a beam 28 having a constant cross-sectional shape and having a length L, the beam 28 being arranged horizontally and supported at both ends. Six stress-concentrating sections (grooves) 27 are provided on the upper surface of the beam 28 while being separated from each other by spacing distances. The respective stress-concentrating sections 27 are formed such that the stress concentration factors K thereof are smaller for those positioned separately farther from the center of the beam 28.

Figure 7B:
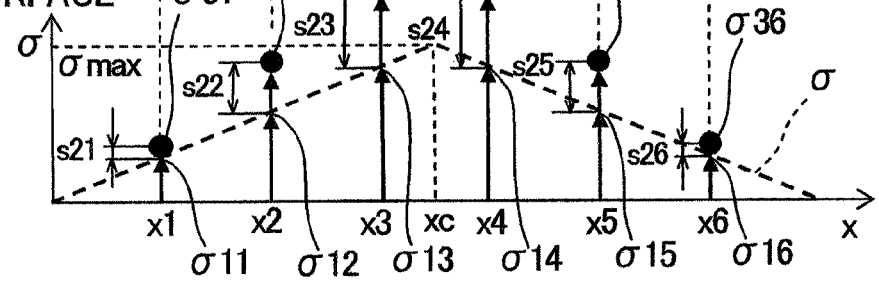
FIG. 7B shows the compressive stress value generated on the upper surface of the beam.
Figure 7C:
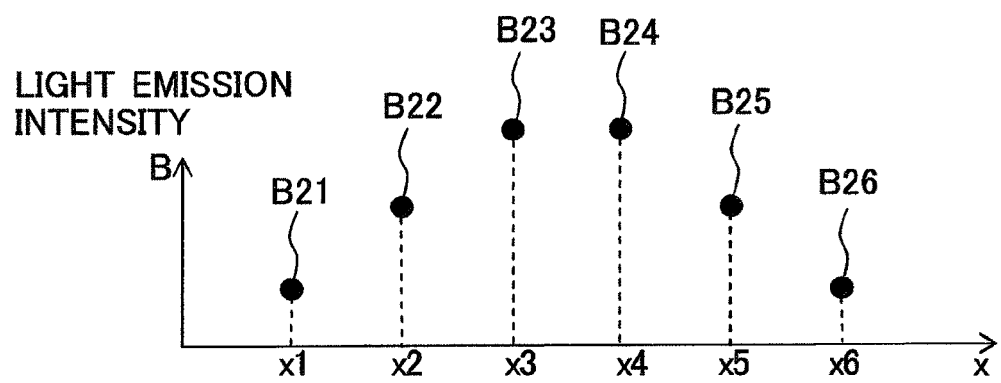
FIG. 7C shows the light emission intensity of the stress light-emitting section formed on the upper surface of the beam.

FIGS. 7B and 7C correspond to FIGS. 6B and 6C. As understood from FIG. 7C, when the stress concentration factor K of the stress-concentrating section 27 is decreased, it is possible to decrease the light emission intensity (luminance) of the stress light-emitting section 17 (not shown) formed at the stress-concentrating section 27 corresponding thereto.

Second Embodiment

Figure 8:
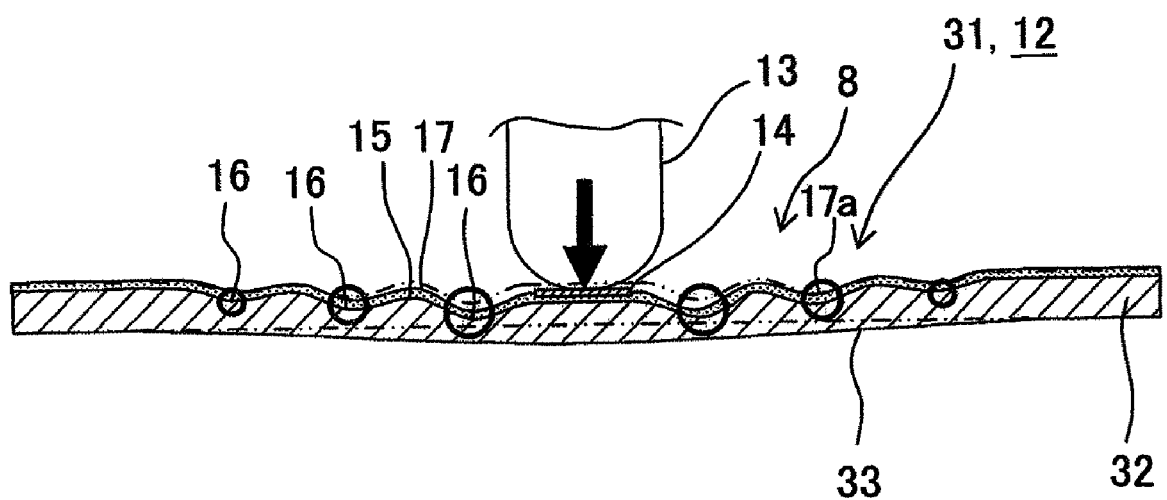
FIG. 8 shows a vertical sectional view illustrating an indication state of a cartridge lid member to which an indicator-structure according to a second embodiment of the present invention is applied.

Next, an explanation will be made with reference to FIG. 8 about a second embodiment of an indicator according to the present invention and an indicator-structure provided with the indicator. The indicator-structure 31 provided with the indicator 8 is also applied to the cartridge lid member 12 of the ink-jet printer 10 in the same manner as in the first embodiment. The second embodiment shown in FIG. 8 is different from the first embodiment shown in FIGS. 2A and 2B as follows. In the case of the first embodiment shown in FIGS. 2A and 2B, the attachment section 21 has the thickness and the rigidity larger than those of the indicator 8, and the rectangular frame-shaped thin-walled section 24 is formed at the boundary portion between the outer circumferential portion of the indicator 8 and the inner circumferential portion of the attachment section 21. On the contrary, in the case of the second embodiment shown in FIG. 8, the attachment section 32 has the thickness and the rigidity which are approximately the same as those of the indicator 8. The thin-walled section 24 is not formed at the boundary portion between the outer circumferential portion of the indicator 8 and the inner circumferential portion of the attachment section 32.

Further, in the first embodiment shown in FIGS. 2A and 2B, the stress light-emitting section 17 is formed on the surface 15 of the indicator 8 (plate-shaped member 22), but the stress light-emitting section 17 is not formed on the surface 15 of the attachment section 21. On the contrary, in the second embodiment shown in FIG. 8, the stress light-emitting sections 17 are formed on the respective surfaces 15 of the indicator (plate-shaped member 22) 8 and the attachment section 32.

According to the indicator 8 and the attachment section 32 of the indicator-structure 31, as shown in FIG. 8, the stress light-emitting section 17 is formed to have the predetermined thickness on the entire front surface 15 of the rectangular plate-shaped member 33 having the substantially constant thickness. Therefore, the shape is simple, and it is possible to reduce the production cost.

Other than the above, the indicator-structure 31 is constructed identically or equivalently to the indicator-structure 9 of the first embodiment, wherein the function is effected identically or equivalently. Therefore, the same or equivalent portions are designated by the same reference numerals in the drawing, and any explanation about the same or equivalent portions is omitted.

Third Embodiment

Next, an explanation will be made with reference to FIGS. 9A and 9B about a third embodiment of an indicator according to the present invention and an indicator-structure provided with the indicator. The indicator-structure 36 provided with the indicator 35 is also applied to the cartridge lid member 12 of the ink-jet printer 10 in the same manner as in the first embodiment.

Figure 9A:
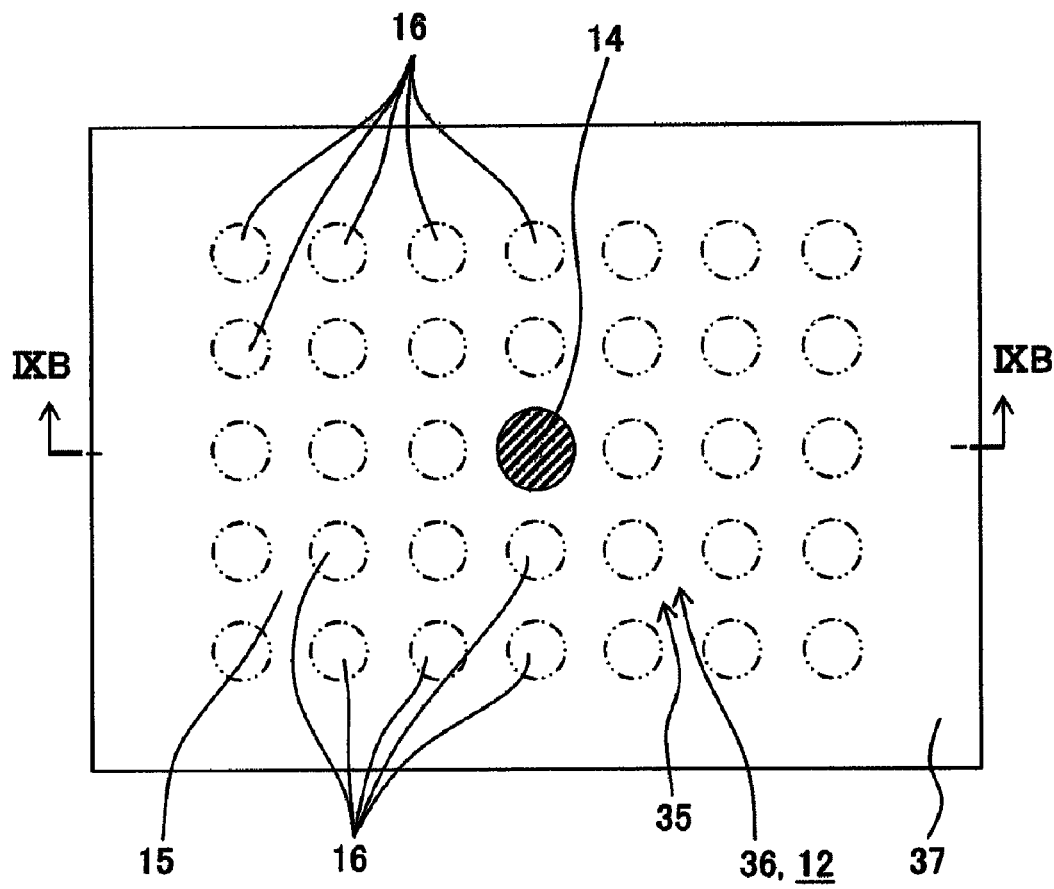
FIG. 9A shows a front view.
Figure 9B:
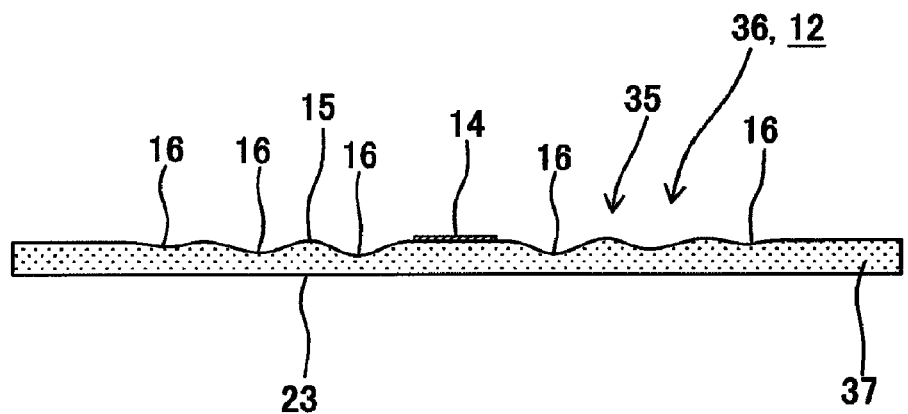
FIG. 9B shows a sectional view taken along a line IXB-IXB.

The indicator-structure 36 of the third embodiment shown in FIGS. 9A and 9B resides in a rectangular plate-shaped member having a substantially constant thickness. A plurality of stress-concentrating sections 16 are provided on the surface 15 of the plate-shaped member in the same manner as in the first embodiment.

The plate-shaped member is formed such that a powder of a stress light-emitting material is mixed and dispersed in a synthetic resin material having the light-transmissive property. In other words, the plate-shaped member itself is the stress light-emitting section. In the rectangular plate-shaped member, the portion of a range, in which the plurality of stress-concentrating sections 16 are provided, is the indicator 35. A rectangular frame-shaped portion, which is formed at the circumferential edge portion of the indicator 35, is the attachment section 37. A hinge section is provided at a lower edge portion of the attachment section 37 in order to open/close the cartridge lid member 12.

According to this indicator-structure 36, the stress light-emitting material emits the light by means of the compressive stress generated in the plurality of stress-concentrating sections 16 formed on the front surface 15 of the indicator 35 respectively. When the indicator 35 is formed by mixing and dispersing the powder of the stress light-emitting material in the synthetic resin material having the light-transmissive property as described above, it is possible to avoid the deterioration of the light-emitting function which would be otherwise caused by the disengagement of the powder of the stress light-emitting material from the indicator 35. The stress-light emitting section can be worked for a long period of time. It is unnecessary to perform any processing step including, for example, the application of the stress light-emitting material to the surface of the plate-shaped member. It is possible to reduce the production cost.

When the base material of the plate-shaped member, with which the powder of the stress light-emitting material is mixed, has the light transmissivity, the light, which is emitted from the stress light-emitting material mixed in the inside of the plate-shaped member, can be efficiently allowed to outgo to the outside of the plate-shaped member. It is possible to enhance the luminance of the light emission.

Other than the above, the indicator-structure 36 is constructed identically or equivalently to the indicator-structure 9 of the first embodiment, wherein the function is effected identically or equivalently. Therefore, the same or equivalent portions are designated by the same reference numerals in the drawings, and any explanation about the same or equivalent portions is omitted.

Fourth Embodiment

Figure 10A:
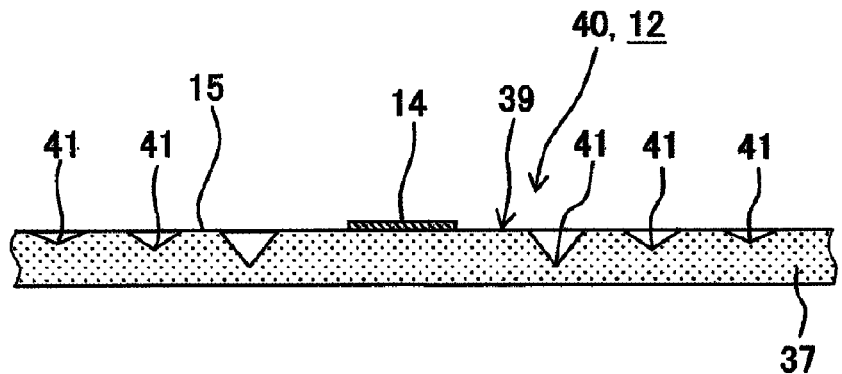
FIG. 10A shows a vertical sectional view illustrating a fourth embodiment.

Next, an explanation will be made with reference to FIG. 10A about a fourth embodiment of an indicator according to the present invention and an indicator-structure provided with the indicator. The indicator-structure 40 provided with the indicator 39 is also applied to the cartridge lid member 12 of the ink-jet printer 10 in the same manner as in the first embodiment. The fourth embodiment shown in FIG. 10A is different from the third embodiment shown in FIGS. 9A and 9B as follows. The recesses of the plurality of stress-concentrating sections 41, 16, which are formed on the surface 15 of the indicator 39, 35, have the shapes substantially corresponding to the parts of spheres in the third embodiment shown in FIGS. 9A and 9B, and the respective bottom portions are formed to have the predetermined curvatures. On the contrary, in the case of the fourth embodiment shown in FIG. 10A, the shapes of the recesses are substantially inverted quadrangular pyramids, and the respective bottom portions are formed to have predetermined angles.

As shown in FIG. 10A, the stress-concentrating sections 41, which are included in the respective stress-concentrating sections 41 of the fourth embodiment and which are positioned separately farther from the operation-indicating section 14, are shallower, and they have larger angles of the bottom portions. Even when the shapes of the stress-concentrating sections 41 are the substantially inverted quadrangular pyramids, the stress is concentrated on the respective bottom portions and the vicinity of the bottom portions. Therefore, the respective bottom portions and the vicinity thereof can function in the same manner as in the third embodiment described above to emit the light.

Other than the above, the indicator-structure 40 is constructed identically or equivalently to the indicator-structure 36 of the third embodiment, wherein the function is effected identically or equivalently. Therefore, the same or equivalent portions are designated by the same reference numerals in the drawing, and any explanation about the same or equivalent portions is omitted. However, other than the shapes of the stress-concentrating sections 41 which are the substantially inverted quadrangular pyramids, it is also allowable to adopt, for example, substantially inverted trigonal pyramids and substantially inverted cones.

Fifth Embodiment

Figure 10B:
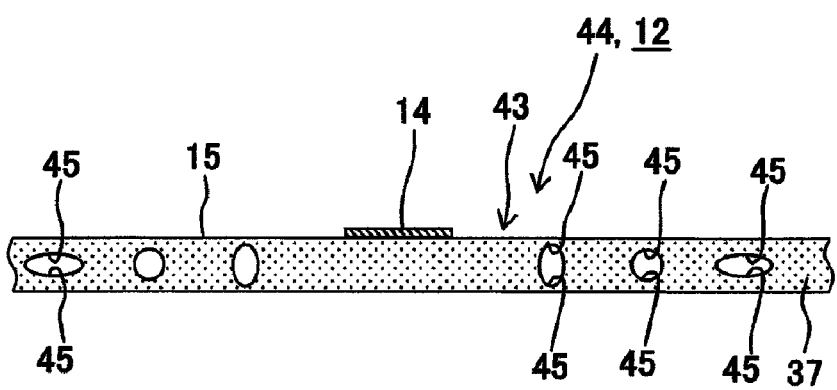
FIG. 10B shows a vertical sectional view illustrating a fifth embodiment.

Next, an explanation will be made with reference to FIG. 10B about a fifth embodiment of an indicator according to the present invention and an indicator-structure provided with the indicator. The indicator-structure 44 provided with the indicator 43 is also applied to the cartridge lid member 12 of the ink-jet printer 10 in the same manner as in the first embodiment. The fifth embodiment shown in FIG. 10B is different from the third embodiment shown in FIGS. 9A and 9B as follows. The stress-concentrating sections 16 of the third embodiment shown in FIGS. 9A and 9B are the bottom portions of the recesses formed on the front surface 15 of the indicator 35. On the contrary, the stress-concentrating sections 45 of the fifth embodiment shown in FIG. 10B are inner surfaces (upper inner surface portions and lower inner surface portions) of hollow portions formed in the indicator 43.

As shown in FIG. 10B, the shapes of the respective hollow portions for forming the respective stress-concentrating sections 45 of the fifth embodiment are substantial ellipses (ellipsoids or spheroids) having vertical lengths longer than horizontal lengths, substantial spheres, and flat disks as referred to in this order for those disposed more closely to the operation-indicating section 14.

In other words, as for the shapes of the respective hollow portions, those positioned separately farther from the operation-indicating section 14 have shorter lengths in the thickness direction of the indicator 43 and longer lengths in parallel to the in-plane direction of the indicator 43. Even when the stress-concentrating sections 45 are provided by forming the hollow portions of the substantial ellipses having the vertical lengths longer than the horizontal lengths, the substantial spheres, and the flat disks in the indicator 43 as described above, the stress is concentrated on the upper inner surface portions and the lower inner surface portions of the respective hollow portions. Therefore, the respective portions and the vicinity thereof can function to emit the light in the same manner as in the third embodiment. Further, the stress-concentrating sections 45 can be provided such that the hollow portions, which have the relatively simple shapes such as the substantial ellipses having the vertical lengths longer than the horizontal lengths, are formed in the indicator 43. Therefore, the stress-concentrating sections 45 can be formed at the desired portions of the indicator 43.

Other than the above, the indicator-structure 44 is constructed identically or equivalently to the indicator-structure 36 of the third embodiment, wherein the function is effected identically or equivalently. Therefore, the same or equivalent portions are designated by the same reference numerals in the drawing, and any explanation about the same or equivalent portions is omitted.

Sixth Embodiment

Figure 10C:
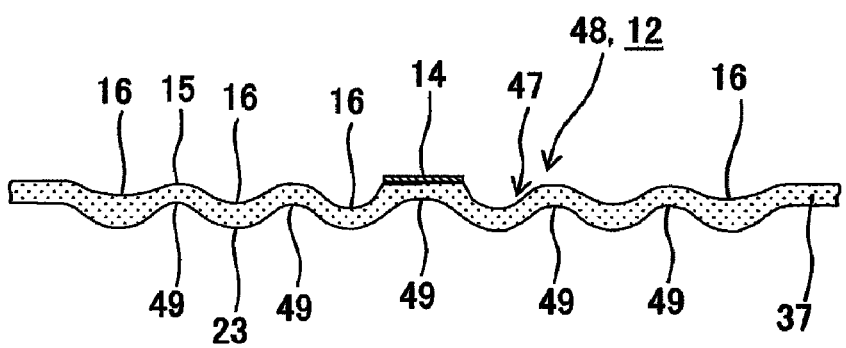
FIG. 10C shows a vertical sectional view illustrating a sixth embodiment.

Next, an explanation will be made with reference to FIG. 10C about a sixth embodiment of an indicator according to the present invention and an indicator-structure provided with the indicator. The indicator-structure 48 provided with the indicator 47 is also applied to the cartridge lid member 12 of the ink-jet printer 10 in the same manner as in the first embodiment. The sixth embodiment shown in FIG. 10C is different from the third embodiment shown in FIGS. 9A and 9B as follows. In the third embodiment shown in FIGS. 9A and 9B, the plurality of stress-concentrating sections 16 are formed on the front surface 15 of the indicator 35 respectively, and they are not formed on the back surface 23. On the contrary, in the sixth embodiment shown in FIG. 10C, the plurality of stress-concentrating sections 16, 49 are formed on the both surfaces of the front surface 15 and the back surface 23 of the indicator 47 respectively.

In the indicator 47 according to the sixth embodiment shown in FIG. 10C, the plurality of first stress-concentrating sections 16, which are formed on the front surface 15, are identical with or equivalent to the plurality of stress-concentrating sections 16 of the third embodiment shown in FIGS. 9A and 9B. The plurality of second stress-concentrating sections 49, which are formed on the back surface 23 of the indicator 47, are recesses having shapes substantially corresponding to parts of spheres in the same manner as the first stress-concentrating sections 16, wherein the respective bottom portions have the same depth and the same curvature. The plurality of second stress-concentrating sections 16 are formed respectively at portions corresponding to the spaces between the mutually adjoining stress-concentrating sections 16 at the diagonal positions shown in FIG. 9A.

For example, when the operation-indicating section 14 of the indicator-structure 48 shown in FIG. 10C is pushed with the finger 13, the predetermined numbers of the first and second stress-concentrating sections 16, 49, which are formed on the front surface 15 and the back surface 23 of the indicator 47 respectively, emit the light in response to the pressing force.

Other than the above, the indicator-structure 48 is constructed identically or equivalently to the indicator-structure 36 of the third embodiment, wherein the function is effected identically or equivalently. Therefore, the same or equivalent portions are designated by the same reference numerals in the drawing, and any explanation about the same or equivalent portions is omitted.

Seventh Embodiment

Figure 11A:
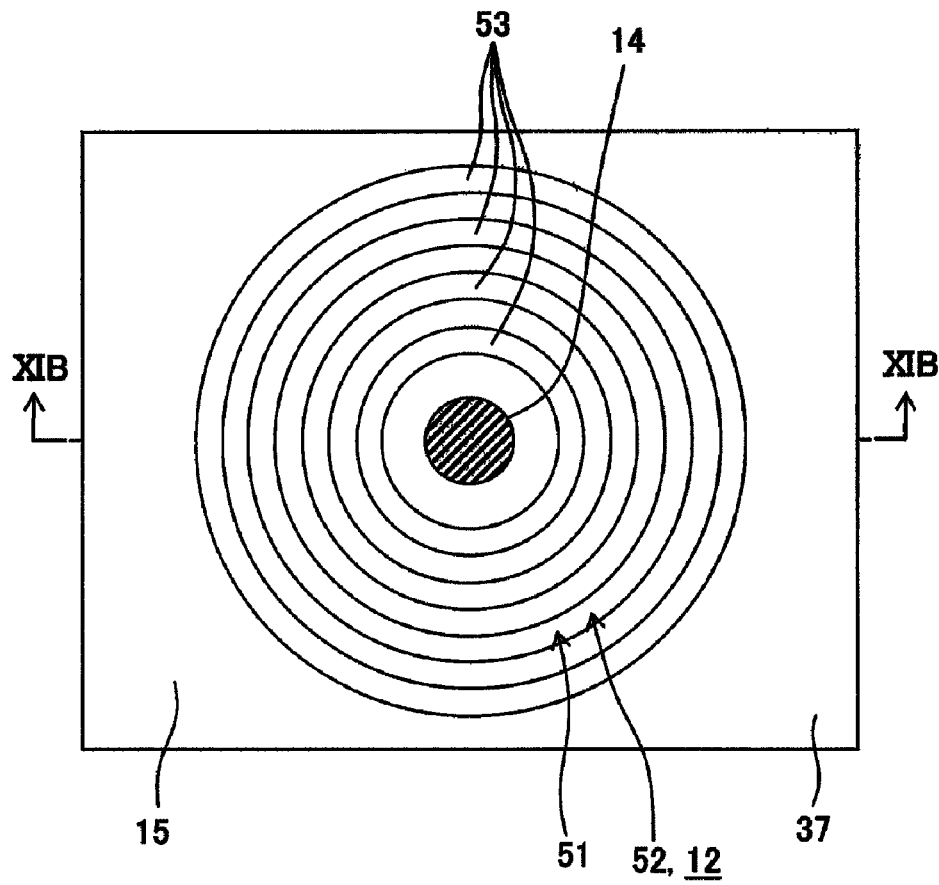
FIG. 11A shows a front view.
Figure 11B:
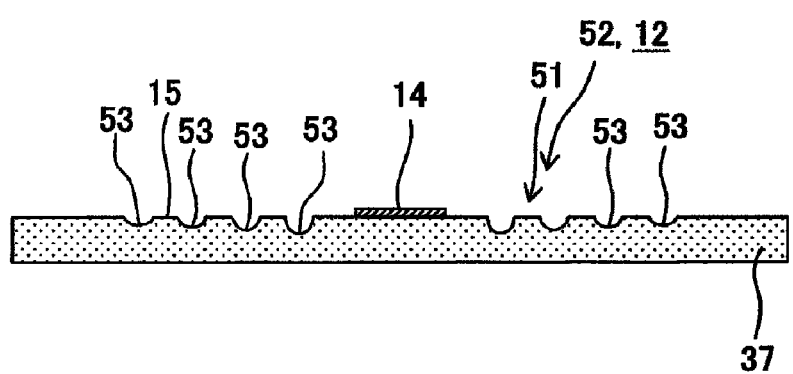
FIG. 11B shows a sectional view taken along a line XIB-XIB.

Next, an explanation will be made with reference to FIGS. 11A and 11B about a seventh embodiment of an indicator according to the present invention and an indicator-structure provided with the indicator. The indicator-structure 52 provided with the indicator 51 is also applied to the cartridge lid member 12 of the ink-jet printer 10 in the same manner as in the first embodiment. The seventh embodiment shown in FIGS. 11A and 11B is different from the third embodiment shown in FIGS. 9A and 9B as follows. In the third embodiment shown in FIGS. 9A and 9B, the plurality of stress-concentrating sections 16 are the recesses formed while providing the spacing distances on the surface 15 of the indicator 35. On the contrary, in the seventh embodiment shown in FIGS. 11A and 11B, the plurality of stress-concentrating sections 53 are formed respectively as quadruple annular grooves disposed about the center of the operation-indicating section 14 on the front surface 15 of the indicator 51.

The stress-concentrating sections 53 of the seventh embodiment shown in FIGS. 11A and 11B have cross-sectional shapes of the respective grooves which are substantially circular arc-shaped. Those positioned separately farther from the operation-indicating section 14 have shallower depths and smaller curvatures of respective bottom portions.

For example, when the operation-indicating section 14 of the indicator-structure 52 shown in FIGS. 11A and 11B is pushed with the finger 13, the stress-concentrating sections 53 emit the light at the luminances corresponding to the pressing force. The range, in which the stress-concentrating sections 53 emit the light, can be widened outwardly as the pressing force, which is brought about when the operation-indicating section 14 is pushed with the finger 13, is more strengthened. Accordingly, it is possible to visually recognize the magnitude of the force applied to the indicator 51 with ease. In this embodiment, all of the depths of the stress-concentrating sections 53 may be identical with each other, and the curvatures of the bottom portions thereof may be smaller at the positions separated farther from the operation-indicating section 14. Alternatively, all of the curvatures of the bottom portions of the stress-concentrating sections 53 may be identical with each other, and the depths thereof may be deeper for those positioned separately farther from the operation-indicating section 14.

Other than the above, the indicator-structure 52 is constructed identically or equivalently to the indicator-structure 36 of the third embodiment, wherein the function is effected identically or equivalently. Therefore, the same or equivalent portions are designated by the same reference numerals in the drawings, and any explanation about the same or equivalent portions is omitted.

Eighth Embodiment

Figure 12A:
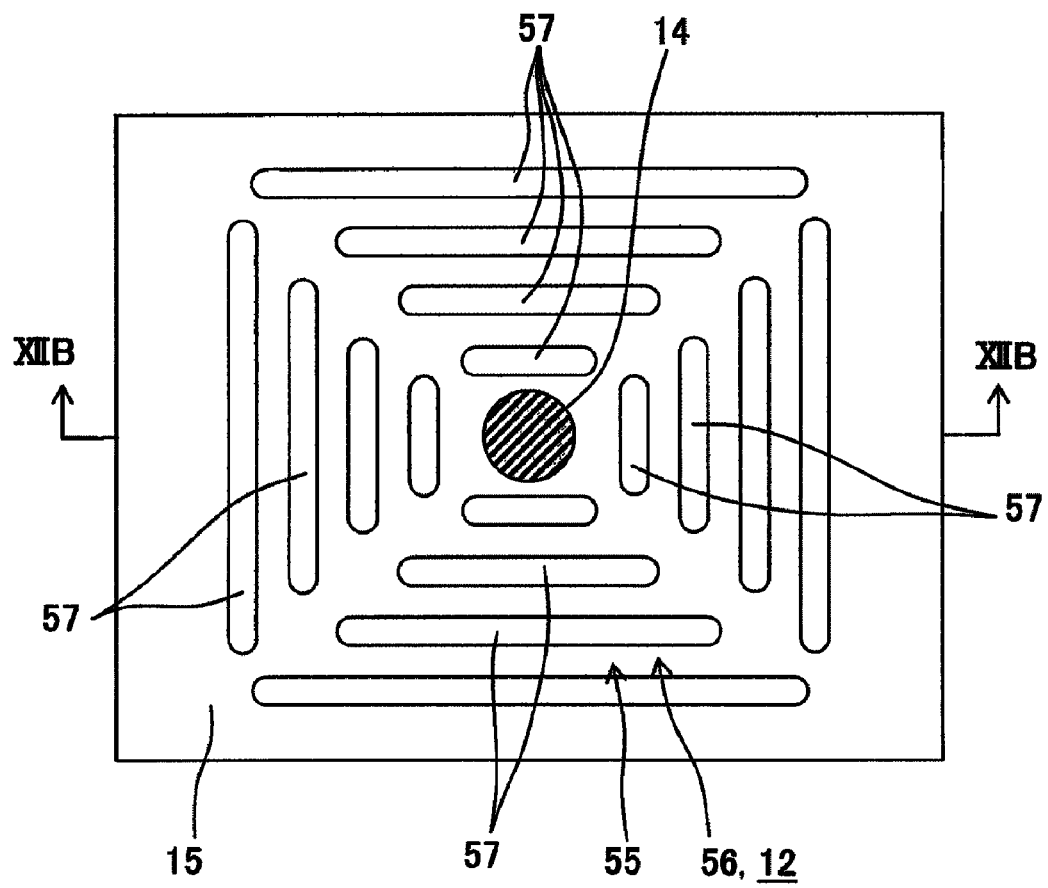
FIG. 12A shows a front view.
Figure 12B:
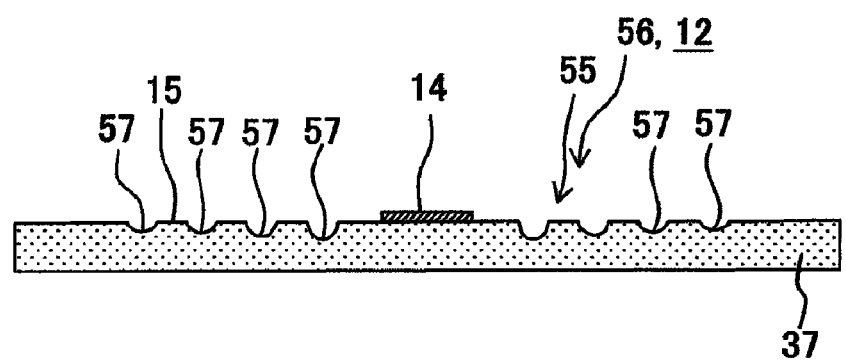
FIG. 12B shows a sectional view taken along a line XIIB-XIIB.
Figure 13:
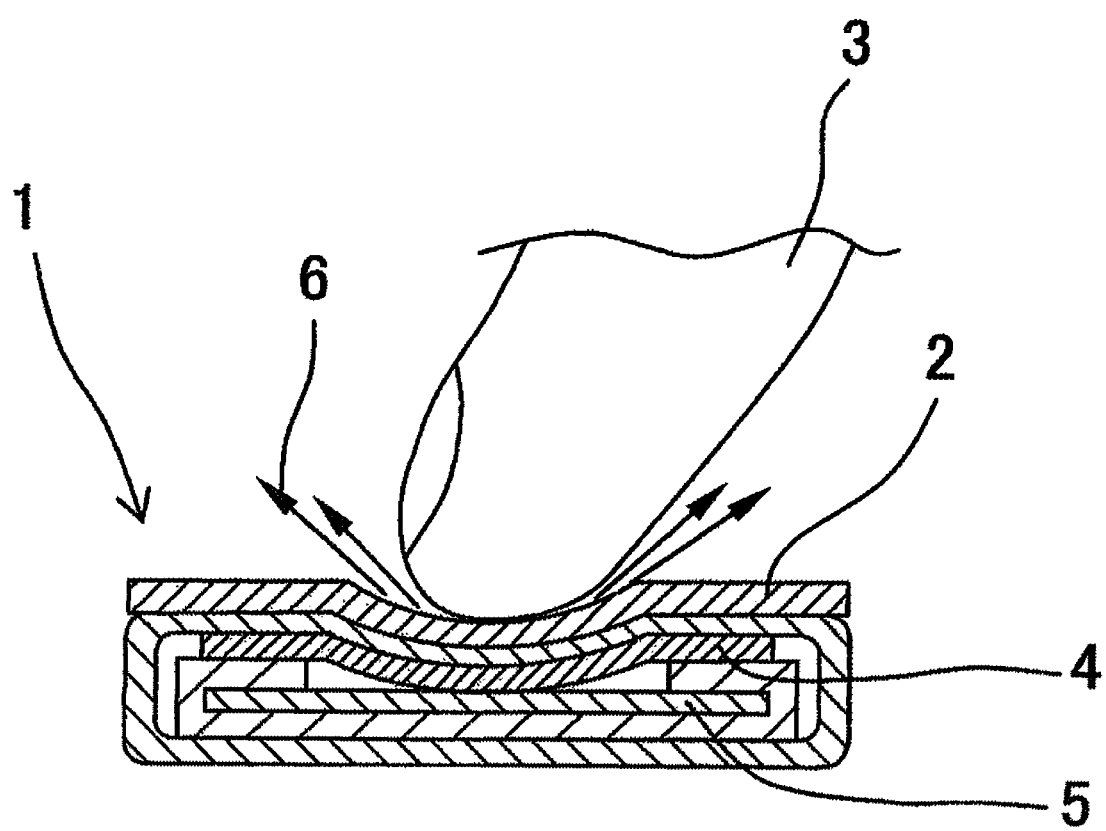
FIG. 13 shows a vertical sectional view illustrating a switch provided with a conventional stress light-emitting member film.

Next, an explanation will be made with reference to FIGS. 12A and 12B about an eighth embodiment of an indicator according to the present invention and an indicator-structure provided with the indicator. The indicator-structure 56 provided with the indicator 55 is also applied to the cartridge lid member 12 of the ink-jet printer 10 in the same manner as in the first embodiment. The eighth embodiment shown in FIGS. 12A and 12B is different from the third embodiment shown in FIGS. 9A and 9B as follows. In the third embodiment shown in FIGS. 9A and 9B, the plurality of stress-concentrating sections 16 are the recesses formed while providing the spacing distances on the surface 15 of the indicator 35. On the contrary, in the eighth embodiment shown in FIGS. 12A and 12B, the plurality of stress-concentrating sections 57 are respectively a plurality of linear grooves each having predetermined length. Further, the plurality of linear grooves are arranged to form a fourfold rectangular trenches disposed to surround the center of the operation-indicating section 14. Each of the rectangular trenches includes four of the linear grooves which are not connected with each other. That is, four corners of each of the rectangular trenches are removed.

The respective stress-concentrating sections 57 of the eighth embodiment shown in FIGS. 12A and 12B have substantially circular arc-shaped cross-sectional shapes of the respective grooves. Those positioned separately farther from the operation-indicating section 14 have shallower depths and smaller curvatures of respective bottom portions.

For example, when the operation-indicating section 14 of the indicator-structure 56 shown in FIGS. 12A and 12B is pushed with the finger 13, the light is emitted in the same manner as the indicator-structure 52 shown in FIGS. 11A and 11B. Therefore, any explanation thereof is omitted.

Other than the above, the indicator-structure 56 is constructed identically or equivalently to the indicator-structure 36 of the third embodiment, wherein the function is effected identically or equivalently. Therefore, the same or equivalent portions are designated by the same reference numerals in the drawings, and any explanation about the same or equivalent portions is omitted.

In the seventh and eighth embodiments described above, all of the depths of the stress-concentrating sections 53, 57 may be identical with each other, and the curvatures of the bottom portions may be smaller at positions separated farther from the operation-indicating section 14. Alternatively, all of the curvatures of the bottom portions of the stress-concentrating sections 53, 57 may be identical with each other, and the depths thereof may be deeper for those positioned separately farther from the operation-indicating section 14.

However, in the respective embodiments described above, the numbers of the stress-concentrating sections, the spacing distances between the stress-concentrating sections, and the shapes of the stress-concentrating sections are those shown, for example, in FIGS. 2A and 2B corresponding to the respective embodiments. However, it is also allowable to adopt any number, any spacing distance, and any shape other than the above. In principle, it is enough that the luminance and the range of the light emission of the stress-concentrating sections 16 to which the stress light-emitting material is applied are changed depending on the magnitude of the force when the force is applied to or exerted on, for example, the indicator 8.

In the first and second embodiments described above, the stress light-emitting section 17 is formed to have the predetermined thickness over the substantially entire front surface 15 of the plate-shaped member 22 for constructing the indicator 8 as shown in, for example, FIGS. 2A and 2B. However, in place thereof, although not shown in the drawings, it is also allowable that the stress light-emitting section 17 is formed to have a predetermined thickness on only the portions at which the plurality of stress-concentrating sections 16 are formed respectively, of the front surface 15 of the plate-shaped member 22.

In the first embodiment described above, as shown in FIGS. 2A and 2B, the plurality of stress-concentrating sections 16 are formed on the surface 15 of the plate-shaped member 22 for constructing the indicator 8, and the stress light-emitting sections 17 are formed to have the predetermined thickness on the surfaces 15 of the plurality of stress-concentrating sections 16. In place thereof, although not shown in the drawings, the plurality of stress-concentrating sections 16 may be formed on the back surface of the plate-shaped member (on the surface disposed on the back side, the surface being disposed on the side opposite to the side on which the operation is performed by the operator, for example, with the finger 13), and the stress light-emitting sections 17 may be formed to have a predetermined thickness on the back surfaces of the plurality of stress-concentrating sections 16. In this arrangement, the plate-shaped member is formed of, for example, a synthetic resin having the light-transmissive property.

When this arrangement is adopted, the light, which is emitted by the stress light-emitting section 17 formed on the back surface of the plate-shaped member, can be allowed to outgo from the front surface 15 by being transmitted through the plate-shaped member having the light-transmissive property. The stress light-emitting section 17 is formed on the back surface of the plate-shaped member, and it is not exposed to the front surface 15. Therefore, for example, even when the external force is applied to the indicator when the operation is performed, for example, with the finger 13, there is no fear of the disengagement from the plate-shaped member. Further, the stress light-emitting section 17 is not provided on the surface 15 of the plate-shaped member. Therefore, this fact can widen the range of selection of the design of, for example, the shape of the front surface 15 of the indicator.

In the embodiments described above, the plurality of stress-concentrating sections are formed on the plate-shaped member. However, the present invention is not limited thereto. For example, one stress-concentrating section may be formed on the plate-shaped member, and the stress light-emitting section may be provided at the stress-concentrating section. Also in this case, when the external force is applied to the portion of the plate-shaped member except for the stress-concentrating section, then the stress, which is generated in the plate-shaped member, is transmitted through the interior of the plate-shaped member, and the stress is concentrated on the stress-concentrating section. Accordingly, even when the external force is applied to the portion of the plate-shaped member disposed at the position not overlapped with the stress-concentrating section, then the stress light-emitting section, which is provided at the stress-concentrating section, can be allowed to emit the light, and there is no fear of the obstruction of the visibility which would be otherwise caused, for example, by the finger placed at the position at which the external force is applied.

In the embodiments described above, the plate-shaped member is the flat surface-shaped member which extends in the predetermined in-plane direction. However, the present invention is not limited thereto. For example, the plate-shaped member may have any three-dimensional structure in which the plate-shaped member is bent in an L-shaped form or a U-shaped form. For example, when the plate-shaped member is a member which is bent in an L-shaped form and which has two plate-shaped portions extending in two direction respectively while interposing a bent portion, then the stress-concentrating section having the stress light-emitting section may be formed at one of the plate-shaped portions, and the operation-indicating section may be provided at the other plate-shaped portion. Even in the case of such an arrangement, the stress, which is generated in the plate-shaped member by the external force applied to the other plate-shaped portion, is transmitted to the one plate-shaped portion, and the stress light-emitting section, which is arranged at the stress-concentrating section, can be allowed to emit the light.

Further, in the respective embodiments described above, for example, as shown in FIGS. 3A and 3B, the example is provided, in which the present invention is applied to the cartridge lid member 12 that is opened by being pushed. However, in place thereof, the present invention is also applicable to a cartridge lid member that is opened by being pulled.

In this case, a grip or handle may be provided at the portion of the front surface 15 of the indicator 8 to which the operation-indicating section 14 is affixed. The stress light-emitting sections 17, which are formed at the plurality of stress-concentrating sections 16, may be allowed to emit the light by pulling the grip or handle by the operator. The grip or handle also functions as the operation-indicating section to indicate that the grip or handle is a pulling section.

In the case of this arrangement, when the grip or handle (operation-indicating section) is pulled, then the range of the light emission effected by the stress light-emitting sections 17 formed at the plurality of stress-concentrating sections 16 is changed, i.e., widened and narrowed depending on the pulling force. Therefore, the pulling force can be recognized with the eyes, and the magnitude of the pulling force can be really felt. Accordingly, the cartridge lid member can be opened by easily and reliably pulling the cartridge lid member with the appropriate force. As a result, it is possible to avoid the breakage of the lid member which would be otherwise caused by the excessive application of the force. Further, it is possible to avoid the re-execution of the operation in order to open/close the lid member.

In the respective embodiments described above, as shown in FIG. 1, the present invention is applied to the cartridge lid member 12 of the ink-jet printer 10. However, the present invention is also applicable to those other than the above. For example, the present invention is also applicable to lid members of various apparatuses such as electric apparatuses, electronic apparatuses, and machines including the ink-jet printer 10 and front wall portions of trays in which the printing paper is stored. Such a tray can be accommodated and/or drawn by pushing and/or pulling the front wall portion of the tray by the operator.

As described above, the indicator and the indicator-structure including the same according to the present invention provide the following excellent effect. That is, the plurality of stress-concentrating sections are arranged such that even when any one of the plurality of stress-concentrating sections is hidden by the finger, the other stress-concentrating sections are not hidden by the finger, for example, when the force is applied to the indicator with the finger or the like, and thus the visibility of the light emission can be secured by the light emission effected by the stress light-emitting material applied to the stress-concentrating sections which are not hidden by the finger. The present invention is appropriate for the application to the indicator and the indicator-structure as described above.

What is claimed is:

1. An indicator which emits a light, the indicator comprising:
    a plate-shaped member which has a stress-concentrating section which causes a stress concentration, and a stress-transmitting section which is connected to the stress-concentrating section and which transmits, to the stress-concentrating section, a stress generated due to an external force applied to the stress-transmitting section;
    a stress light-emitting section formed at the stress-concentrating section and formed of a stress light-emitting material which emits the light in response to a change of the stress; and
    an external force-applying section, to which the external force is applied, which is formed in the stress-transmitting section of the plate-shaped member;
    wherein the stress-concentrating section and the external force-applying section are arranged, on one surface of the plate-shaped member, at positions different from each other; and
    wherein the stress light-emitting section emits the light at least in a direction which is opposite to a direction of the external force.

2. An indicator which emits a light, the indicator comprising:
    a plate-shaped member which has a stress-concentrating section which causes a stress concentration, and a stress-transmitting section which is connected to the stress-concentrating section and which transmits, to the stress-concentrating section, a stress generated due to an external force applied to the stress-transmitting section; and
    a stress light-emitting section formed at the stress-concentrating section and formed of a stress light-emitting material which emits the light in response to a change of the stress;
    wherein the stress-concentrating section includes a plurality of individual stress-concentrating sections which are arranged with spacing distances with each other, the stress light-emitting section includes a plurality of individual stress light-emitting sections which are formed corresponding to the individual stress light-emitting sections respectively; and
    wherein one of the individual stress light-emitting sections, which is provided for one of the individual stress-concentrating sections corresponding to the one individual stress light-emitting section, emits the light in response to the external force applied to the stress-transmitting section.

3. The indicator according to claim 2;
    wherein the plurality of individual stress-concentrating sections are formed as recesses or hollow space sections.

4. The indicator according to claim 3;
    wherein areas of the plate-shaped member, at which the individual stress-concentrating sections are formed, are the recesses which have curvatures larger than those of the other areas at which the individual stress-concentrating sections are not formed.

5. The indicator according to claim 2;
    wherein the individual stress-concentrating sections are formed as thin-walled sections.

6. The indicator according to claim 2;
    wherein the external force is applied onto one predetermined surface of the plate-shaped member; and
    wherein the individual stress light-emitting portions are provided on the one surface of the plate-shaped member.

7. The indicator according to claim 2;
    wherein the plate-shaped member includes a base material, and the stress light-emitting material is mixed into the base material of the plate-shaped member.

8. The indicator according to claim 7;
    wherein the base material of the plate-shaped member has a light-transmissive property.

9. The indicator according to claim 2;
    wherein the plate-shaped member includes a base material having a light-transmissive property;
    wherein the external force is applied onto one surface of the plate-shaped member; and
    wherein the individual stress light-emitting sections are provided on the other surface of the plate-shaped member opposite to the one surface.

10. The indicator according to claim 2;
    wherein a degree of the stress concentration of each of the individual stress-concentrating sections is decreased at positions separated farther from a predetermined portion of the plate-shaped member.

11. The indicator according to claim 10;
    wherein an operation-indicating section, which indicates that the predetermined portion is a pushing section or a pulling section, is affixed to the predetermined portion.

12. The indicator according to claim 4;
    wherein individual stress-concentrating sections, which are included in the individual stress-concentrating sections and which are positioned separately farther from a predetermined portion of the plate-shaped member, each have a bottom portion with a shallower depth or smaller curvature.

13. An indicator-structure which includes:

the indicator as defined in claim 2; and an attachment section which is attached to a circumferential edge portion of the plate-shaped member, wherein the indicator has a rigidity which is smaller than that of the attachment section.

14. The indicator-structure according to claim 13;

wherein a thin-walled section is provided at a boundary portion between the plate-shaped member and the attachment section.

15. The indicator according to claim 2;

wherein the stress-transmitting section of the plate-shaped member is formed with an external force-applying section at which the external force is applied, and the individual stress-concentrating sections are arranged to form a first group which surrounds the external force-applying section and a second group which surrounds the first group.

16. The indicator according to claim 15;

wherein individual stress-concentrating sections, among the plurality of the individual stress-concentrating sections, forming each of the first group and the second group are arranged at substantially a same distance from the external force-applying section respectively.

17. The indicator according to claim 15;

wherein the individual stress-concentrating sections forming the first group are deeper than the individual stress-concentrating sections forming the second group; or wherein the individual stress-concentrating sections forming the first group have bottom portions with curvatures which are larger than curvatures of bottom portions of the individual stress-concentrating sections forming the second group.

\* \* \* \* \*